(12) United States Patent
Seroff et al.

(10) Patent No.: US 12,149,079 B2
(45) Date of Patent: *Nov. 19, 2024

(54) ENERGY MANAGEMENT FOR CONNECTED CHARGING STATIONS WITH BIDIRECTIONALITY

(71) Applicant: SPEED CHARGE, LLC, Carter Lake, IA (US)

(72) Inventors: Nicholas Seroff, San Jose, CA (US); Tabish Shibly, Oakland, CA (US)

(73) Assignee: SPEED CHARGE, LLC, Carter Lake, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,311

(22) Filed: Aug. 8, 2023

(65) Prior Publication Data

US 2024/0204522 A1 Jun. 20, 2024

Related U.S. Application Data

(63) Continuation of application No. 18/066,970, filed on Dec. 15, 2022, now Pat. No. 11,749,991.

(51) Int. Cl.
*B60L 53/14* (2019.01)
*H02J 3/00* (2006.01)
*H02J 3/14* (2006.01)

(52) U.S. Cl.
CPC ............. *H02J 3/144* (2020.01); *B60L 53/14* (2019.02); *H02J 3/0075* (2020.01)

(58) Field of Classification Search
CPC .......... H02J 3/144; H02J 3/0075; B60L 53/14
(Continued)

(56) References Cited

U.S. PATENT DOCUMENTS

| 8,054,039 B2 | 11/2011 | Bauerle et al. |
| 11,584,250 B1 | 2/2023 | Palombini |

(Continued)

FOREIGN PATENT DOCUMENTS

| WO | WO-2022/020566 A1 | 1/2022 |
| WO | WO-2022/241267 A1 | 11/2022 |

OTHER PUBLICATIONS

International Search Report and Written Opinion for Application No. PCT/US2022/038802, dated Jan. 19, 2023.

(Continued)

*Primary Examiner* — Nathaniel R Pelton
(74) *Attorney, Agent, or Firm* — MARSHALL, GERSTEIN & BORUN LLP

(57) ABSTRACT

In order to ensure reliable power for charging electric vehicles is available at each charging station at a charging site having multiple charging stations, the systems and methods disclosed herein provide for charge transfers between batteries of such charging stations. A plurality of charging stations at a charging site are connected via local alternating current (AC) circuit in order to transfer energy between the charging stations, such as to balance the energy stored at the respective batteries of the charging stations. Each charging station includes a system controller controlling operation of the charging station and a bidirectional inverter to convert AC input power from a power grid or the local AC circuit to direct current (DC) power for storage in a battery of the charging station and to convert DC power from the battery to AC output power to the local AC circuit, as controlled by the system controller.

18 Claims, 9 Drawing Sheets

(58) Field of Classification Search
USPC .......................................................... 320/109
See application file for complete search history.

(56) References Cited

U.S. PATENT DOCUMENTS

| | | | |
|---|---|---|---|
| 2011/0074350 A1* | 3/2011 | Kocher | ................. B60L 53/63 |
| | | | 320/109 |
| 2012/0074901 A1 | 3/2012 | Mohammed et al. | |
| 2013/0113413 A1 | 5/2013 | Harty et al. | |
| 2015/0054466 A1 | 2/2015 | Kinomura et al. | |
| 2016/0006253 A1 | 1/2016 | Saussele et al. | |
| 2016/0009191 A1 | 1/2016 | Becker et al. | |
| 2016/0152151 A1 | 6/2016 | Yang et al. | |
| 2019/0241089 A1 | 8/2019 | Heyne et al. | |
| 2019/0372465 A1* | 12/2019 | Xu | ............................ H02J 7/02 |
| 2019/0389315 A1 | 12/2019 | Zhu | |
| 2020/0001730 A1* | 1/2020 | Gohla-Neudecker | ....................... B60L 53/63 |
| 2020/0031238 A1 | 1/2020 | Kydd | |
| 2020/0321797 A1 | 10/2020 | Gerrits | |
| 2021/0039516 A1 | 2/2021 | Bromback et al. | |
| 2021/0170897 A1 | 6/2021 | Ellis | |
| 2023/0011000 A1* | 1/2023 | Zhou | ..................... B60L 53/305 |
| 2023/0033955 A1 | 2/2023 | Seroff et al. | |
| 2023/0117407 A1* | 4/2023 | Quattrini | ................. B60L 58/24 |
| | | | 320/109 |

OTHER PUBLICATIONS

Ray et al. "Modeling and power management of electric vehicle charging system." 2021 International Conference on Smart-Green Technology in Electrical and Information Systems (ICSGTEIS). IEEE, 2021.

International Search Report and Written Opinion for Application No. PCT/US2023/084179, dated Apr. 24, 2024.

* cited by examiner

ENERGY MANAGEMENT FOR CONNECTED CHARGING STATIONS WITH BIDIRECTIONALITY

CROSS-REFERENCE TO RELATED APPLICATION

This application is a continuation of U.S. patent application Ser. No. 18/066,970, filed Dec. 15, 2022, the disclosure of which is hereby incorporated herein by reference in its entirety.

TECHNICAL FIELD

At least one aspect generally relates to improvements to vehicle charging stations generally and more particularly to improvements in energy management and charge transfer between multiple vehicle charging stations at a charging site.

BACKGROUND

Charging stations provide electric power to electric vehicles (EVs), including plug-in hybrid vehicles, that can operate without the use or with limited use of hydrocarbon-based fuels. Installation of conventional charging stations typically requires improvements to infrastructure including upgrades to electrical service and construction of suitable housing. The costs, planning, and time required to install these charging systems can be a deterrent to potential commercial or residential operators. To reduce the installation and operating requirements associated with traditional charging stations, some charging stations include batteries to store energy received from a power source (such as an electric utility power grid) over an extended time interval. At charging sites having multiple charging stations, different rates of utilization of the charging stations often results in some charging stations have more energy stored in their batteries than others. For example, drivers frequently park and charge at the charging stations nearest a location of interest (e.g., an entrance to a business), resulting in higher rates of battery discharging for such charging stations. Since the batteries of the charging stations are discharged during vehicle charging at a faster rate than they are charged from the power source, however, the batteries of the more frequently used charging stations may be depleted more quickly than the batteries of charging stations that are less frequently used. Driver frustration resulting from the inability to charge at charging stations with depleted batteries or from slow charging at such charging stations has a detrimental impact on adoption of electric and charging hybrid vehicles. Therefore, improved techniques for ensuring reliable power at charging stations using batteries to store charge are needed in general and in particular for charging sites having multiple charging stations.

SUMMARY

The systems, methods, and computer-readable instructions disclosed herein solve the problem of ensuring reliable power for each of the electric vehicle charging stations at a charging site having multiple electric vehicle chargers through charge transfers between such electric vehicle chargers. As described herein, a vehicle charging system for charging a vehicle is provided, the vehicle charging system comprising: one or more alternating current (AC) power ports configured to receive input electric power from an AC power source and to provide output electric power from the vehicle charging system to a local AC circuit at a charging site; a battery configured to receive and store direct current (DC) electric power derived from the input electric power; a bidirectional inverter disposed between the one or more AC power ports and the battery; a vehicle coupling configured to receive a charging current from the battery and to provide an electrical interconnect between the vehicle charging system and the vehicle in order to provide the charging current to the vehicle; and a system controller comprising one or more processors configured to control charge transfers. The local AC circuit connects the vehicle charging system to an additional AC power port of an additional vehicle charging system at the charging site, and the bidirectional inverter is configured to convert AC power from the one or more AC power ports into DC power to charge the battery and to convert DC power from the battery into AC power to be supplied from the vehicle charging system to the one or more AC power ports. The system controller is configured to control charge transfers by determining occurrence of a triggering condition for charge transfer between the battery of the vehicle charging system and an additional battery of the additional vehicle charging system via the local AC circuit and, in response to determining occurrence of the triggering condition, controlling the bidirectional inverter to effect the charge transfer based upon the triggering condition. The charge transfer may be effect by either (i) converting a DC output power from the battery into an AC output power to the one or more AC power ports to provide the AC output power to the local AC circuit or (ii) converting an AC input power received from the local AC circuit via the one or more AC power ports into a DC input power to charge the battery.

In some embodiments, the local AC circuit is separate from the AC power source, in which case the one or more AC power ports comprise a first AC power port configured to receive the input electric power from the AC power source and a second AC power port configured to connect to the local AC circuit. Alternatively, the one or more AC power ports may consist of one AC power port connected to the local AC circuit, such that the input electric power is received from the AC power source via the local AC circuit.

The triggering condition may comprise various conditions, which may be separately or collectively determinative of a situation in which a charge transfer should occur. In some embodiments, the triggering condition comprises disconnection of the AC power source from the local AC circuit. Determining such triggering condition may comprise detecting receipt of an electronic message indicating disconnection of the AC power source from a site meter connecting the local AC circuit to the AC power source, and wherein the AC power source comprises an electric power grid. Additionally or alternatively, determining occurrence of the triggering condition may comprise detecting receipt of an electronic message from either a site meter or a centralized management system, the electronic message indicating a demand level for the AC power source exceeds a threshold demand level.

In some embodiments, the triggering condition is based at least in part upon a charge level of the battery and an additional charge level of the additional battery of the additional charging system. An indication of the additional charge level may be received in an electronic message received from the additional charging system. In further embodiments, the triggering condition is based at least in part upon a charge imbalance between a charge level of the battery of the vehicle charging system and an additional charge level of the additional battery of the additional charging system exceeding a threshold charge differential. In some such embodiments, the threshold charge differential is dynamically based upon one or more of the following charging site conditions: current availability of the input electric power from the AC power source, predicted future availability of the input electric power from the AC power source, current charging demand for each of the vehicle charging system and the additional vehicle charging system, predicted future demand for each of the vehicle charging system and the additional vehicle charging system, or operational statuses of the vehicle charging system and the additional vehicle charging system. In still further embodiments, the triggering condition comprises a discharge imbalance between the charging current provided by the vehicle coupling of the vehicle charging system and an additional charging current of an additional vehicle coupling of the additional charging system exceeding a threshold discharge differential over a predetermined time interval.

In some embodiments, the triggering condition comprises receiving a command from a centralized management system communicatively connected to the vehicle charging system and the additional vehicle charging system via a communication network. The centralized management system may generate and send such command based upon any of the various conditions described above. In order to facilitate detection of such conditions, the centralized management system may obtain operating data from each of a plurality of vehicle charging systems at a charging site. In some embodiments, the centralized management system may further obtain an indication of a demand level for the AC power source, in order to determine whether the demand level exceeds a threshold demand level. In some embodiments, the centralized management system may communicate with a plurality of vehicle charging systems at a charging site to both receive operating data and to send commands to control each of the plurality of vehicle charging systems to effect a determined charge transfer. In further embodiments, the centralized control system may further communicate with one or more external batteries or external battery systems connected to the plurality of vehicle charging systems at the charging site.

Methods or computer-readable media storing instructions for implementing all or part of the vehicle charging system described above may also be provided in some aspects in order to provide or operate a vehicle charging station. Additional or alternative features described herein below may be included in some aspects.

According to one such aspect, a method for managing energy transfers between a plurality of vehicle charging systems as described above disposed at a charging site is provided, the method comprising: charging respective batteries of a vehicle charging system and an additional vehicle charging system at the charging site using an input electric power from an AC power source via respective AC power ports and bidirectional inverters, wherein each respective bidirectional inverter of the vehicle charging system or the additional vehicle charging system is configured to convert AC power from the respective AC power port into DC power to charge the respective battery and to convert DC power from the respective battery into AC power to be supplied to the respective AC power port; determining, by a system controller of the vehicle charging system, occurrence of a triggering condition for charge transfer between the battery of the vehicle charging system and the additional battery of the additional vehicle charging system via a local AC circuit connecting the AC power port or a secondary AC power port of the vehicle charging system to an additional AC power port or an additional secondary AC power port of an additional vehicle charging system at the charging site; and in response to determining occurrence of the triggering condition, controlling, by the system controller, the bidirectional inverter of the vehicle charging system to effect the charge transfer based upon the triggering condition. The charge transfer may be effected by either (i) converting a DC output power from the battery into an AC output power to the AC power port or the secondary AC power port to provide the AC output power to the local AC circuit or (ii) converting an AC input power received from the local AC circuit via the AC power port or the secondary AC power port into a DC input power to charge the battery.

According to another such aspect, a site charging system for charging vehicles at a charging site is provided, the site charging system comprising: a plurality of vehicle charging systems as described above disposed at the charging site connected via a local AC circuit; and a centralized management system communicatively connected to the plurality of vehicle charging systems via an electronic communication connection, comprising one or more processors configured to: determine occurrence of a triggering condition for charge transfer between the respective batteries of a first vehicle charging system and a second vehicle charging system of the plurality of vehicle charging systems via the local AC circuit, and, in response to determining occurrence of the triggering condition, control (i) the bidirectional inverter of the first vehicle charging system to convert a DC output power from the battery of the first vehicle charging system into an AC output power to the one or more AC power ports of the first vehicle charging system to provide the AC output power to the local AC circuit and (ii) the bidirectional inverter of the second vehicle charging system to convert an AC input power received from the local AC circuit via the one or more AC power ports of the second vehicle charging system into a DC input power to charge the battery of the second vehicle charging system.

DETAILED DESCRIPTION

The techniques disclosed herein generally relate to solving the problem of ensuring reliable power for each of the charging stations at a charging site having multiple electric vehicle chargers. In order to facilitate energy transfers between batteries of the multiple charging stations at the charging site, one or more of a local alternating current (AC) circuit or a direct current (DC) bus is provided at the charging site and connected to each of the charging stations. Each charging station is configured to transfer electric power via one or both of the local AC circuit or the DC bus. The charging stations thus include at least one of a bidirectional inverter controllable by a system controller to provide or receive AC power via the local AC circuit or a DC bus connection controllable by the system controller to provide and receive DC power via the DC bus at the charging site. By transferring charge between charging stations at the charging site, charge imbalances between batteries of the charging stations may be reduced or eliminated, thereby ensuring each of the charging stations has sufficient power to charge vehicles. Additional or alternative features are described in further detail below.

Several aspects of electric vehicle (EV) or plug-in hybrid vehicle charging systems and related charging site systems will now be presented with reference to various embodiments. Although described herein as relating to EVs, it should be understood that the techniques may be applied equally to plug-in hybrid vehicles or other wholly or partially battery-powered devices that may be charged by a high-voltage or high-power charging station. Charging stations are used for recharging batteries in EVs by supplying AC or DC power to EVs. In turn, the charging stations receive an electric power supply from a utility power grid connection or local power source (e.g., solar, wind, water, or hydrocarbon-powered power generation systems). Some charging stations may store power in one or more internal or connected batteries in order to smooth power consumption over time. In addition to using such stored power to charge EVs, charging stations may further provide such stored power to other charging stations disposed at the same charging site, thereby enabling efficient use of the power stored at multiple charging stations to charge EVs at any of the charging stations. In some embodiments, such charge sharing between charging stations at a charging site further enables charging EVs without an active connection to a utility power grid or other power source.

Figure 1A:
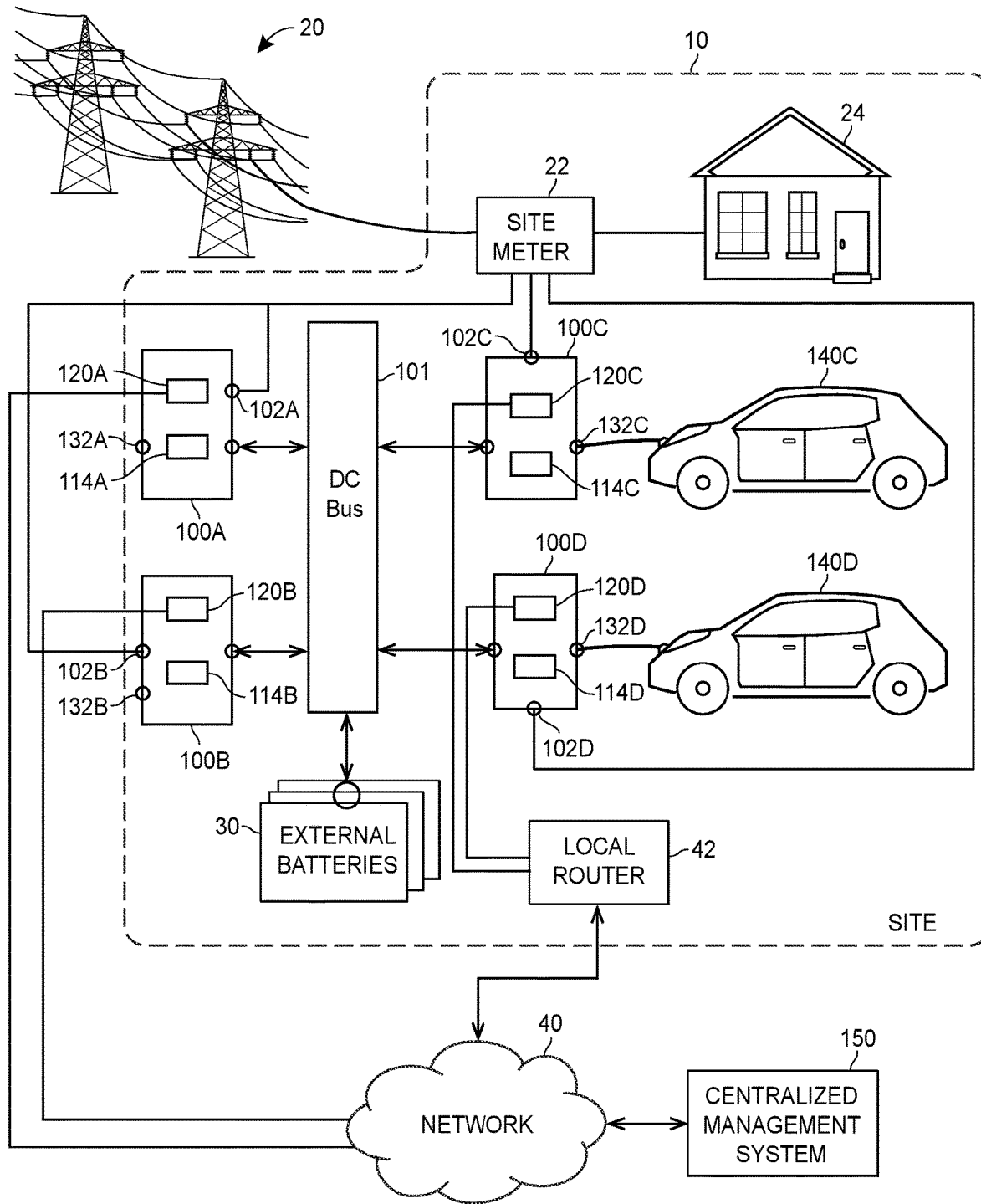
FIG. 1A illustrates a block diagram of an example of a charging site configured for energy management between multiple vehicle charging systems via a DC bus in accordance with certain aspects disclosed herein.

FIG. 1A illustrates a block diagram of an example of a charging site 10 configured for energy management between multiple EV charging systems 100A-D via a DC bus 101. The charging site 10 is supplied with AC power from an electric power grid 20 via a site meter 22, which records power consumption and connects the various electrical components disposed at the charging site 10 to the electric power grid 20. Thus, the electric power grid 20 provides AC power to each of the EV charging systems 100A-D and other electrical components via the site meter 22, including providing AC power to a non-charging load 24 (e.g., commercial building electrical infrastructure) at the charging site 10. In some embodiments, the site meter 22 is a smart meter including additional control logic and communication functionality. For example, the site meter 22 may be configured to communicate with one or more external servers (not show) and/or the centralized management system 150 to obtain demand data regarding load on or demand charges for AC power from the electric power grid 20. In some such embodiments, the site meter 22 may be configured to disconnect part or all of the loads from the electric power grid 20 upon the occurrence of certain conditions (e.g., during peak hours or when the power grid is unstable due to high demand). In this way, the site meter 22 may be used to separate the charging site 10 from the electric power grid 20 when needed. Although only one site meter 22 is shown, some embodiments may include a plurality of meters, each of which may perform part or all of the operation of the site meter 22. Such embodiments may be implemented to facilitate more targeted control of operations of individual EV charging systems 100 or non-charging loads 24 at the charging site 10.

The AC power from the site meter 22 is provided as an input AC electric power to the respective input ports 102A-D of the EV charging systems 100A-D via one or more wired AC connections. In some embodiments, the input AC electric power is received at each of the input ports 102A-D as a 120V or 240V single-phase or three-phase AC power supply. As discussed elsewhere herein, each of the EV charging systems 100A-D converts and stores such input AC electric power to DC power stored in batteries of respective energy storage modules 114A-D, from which charging currents may be provided to vehicles via vehicle couplings 132A-D of the EV charging systems 100A-D. The EV charging systems 100A-D are controlled by respective system controllers 120A-D, which monitor operating data of the respective EV charging systems 100A-D and control charging and discharging of the energy storage modules 114A-D.

In some embodiments, the DC power may be stored in the energy storage modules 114A-D over an interval of time in order to provide charging current to EVs via respective vehicle couplings 132A-D at a faster rate than the input AC electric power is received by the EV charging systems 100A-D. While this has significant advantages in reducing the electrical infrastructure requirements for the charging site 10, some of the EV charging systems 100A-D may be used more that others. For example, EV charging systems 100C and 100D may experience greater use due to closer proximity to a destination (e.g., by being located in a parking lot at locations nearer an entrance to a commercial building). As illustrated, vehicles 140C and 140D may be connected to EV charging systems 100C and 100D by vehicle couplings 132C and 132D, respectively, in order to receive charging currents from energy stored in the energy storage modules 114C and 114D, while no vehicles are charging at EV charging systems 100A and 100B. Thus, the batteries of EV charging systems 100C and 100D will discharge faster than those of EV charging systems 100A and 100B, resulting in a charge imbalance among the energy storage modules 114A-D. To address such an imbalance, energy may be transferred from EV charging systems 100A and 100B to EV charging systems 100C and 100D via the DC bus 101.

The DC bus 101 provides a direct DC power connection between the EV charging systems 100A-D to enable charge transfers among the energy storage modules 114A-D. Each of the EV charging systems 100A-D includes an inter-charger connection (not shown) that provides a bidirectional DC connection to the DC bus 101, and thereby to each of the other EV charging systems 100A-D. Through such inter-charger connections, the EV charging systems 100A-D are enabled to receive and to provide DC current at various times as part of charge transfers, which may be used to perform charge balancing between the energy storage modules 114A-D. In some embodiments, one or more external batteries 30 are also connected to the DC bus 101 to store energy received from the EV charging systems 100A-D and provide the stored energy at a later time, as needed. Such external batteries 30 may include controllers (not shown) to control charging and discharging, or the external batteries 30 may be controlled by the system controllers 120A-D of the EV charging systems 100A-D or by a centralized management system 150. Similarly, in various embodiments, charge transfers may be determined and controlled by the system controllers 120A-D of the EV charging systems 100A-D or by a centralized management system 150. To facilitate such control decisions, each of the system controllers 120A-D is connected via wired or wireless communication connections with the other system controllers 120A-D and/or with the centralized management system 150 to exchange electronic messages or signals.

The centralized management system 150 may communicate with each of the EV charging systems 100A-D in order to monitor operating data regarding the EV charging systems 100A-D and to determine and control charge transfers as needed. The centralized management system 150 may be located at the charging site 10 or at a location remote from the charging site 10. When remote from the charging site 10, the centralized management system 150 may be communicatively connected to the EV charging systems 100A-D via a network 40, which may be a proprietary network, a secure public internet, a virtual private network, or some other type of network, such as dedicated access lines, plain ordinary telephone lines, satellite links, cellular data networks, or combinations of these. In various embodiments, the EV charging systems 100A-D may be communicatively connected with the network 40 directly or via a local router 42. In some embodiments in which the centralized management system 150 is located at the charging site 10, the centralized management system 150 may be combined with or incorporated within any of the EV charging systems 100A-D. In still further embodiments, the centralized management system 150 may be configured as a local cloud or server group distributed across the system controllers 120A-D of the EV charging systems 100A-D in order to provide robust control in the event of a network disruption.

In some embodiments, the centralized management system 150 may also communicate with remote EV charging systems that are deployed in locations remote from the charging site 10, which locations may be separated by large geographic distances. For example, the centralized management system 150 may communicate with EV charging systems 100 located in different parking facilities, on different floors of the same parking structure, or in different cities. Such centralized management system 150 may comprise one or more servers configured to receive operating data from and to send data and/or control commands to each of the EV charging systems 100A-D. To facilitate communication, the centralized management system 150 may be communicatively connected to the system controllers 120A-D of the EV charging systems 100A-D via an electronic communication link with a communication interface module (not shown) within each of the EV charging systems 100A-D.

The centralized management system 150 may group or relate EV charging systems according to their location, their intended function, availability, operating status, and capabilities. The centralized management system 150 may remotely configure and control the EV charging systems, including the EV charging systems 100A-D. The centralized management system 150 may remotely enforce regulations or requirements governing the operation of the EV charging systems 100A-D. The centralized management system 150 may remotely interact with users of the EV charging systems 100A-D. The centralized management system 150 may remotely manage billing, maintenance, and error detection for each of the EV charging systems 100A-D. For example, error conditions resulting in manual disconnection of a vehicle from any of the EV charging systems 100A-D may be reported by such EV charging system to the centralized management system 150 for analysis. The centralized management system 150 may also communicate with mobile communication devices of users of the EV charging systems 100A-D, such as mobile communication devices or other computing devices used by operators of the EV charging systems 100A-D to enable the operator to self-configure the EV charging systems 100A-D, charge pricing, language localization, currency localization, and so on. Operation of the centralized management system 150 in relation to charge transfers between the EV charging systems 100A-D is further described elsewhere herein.

Figure 1B:
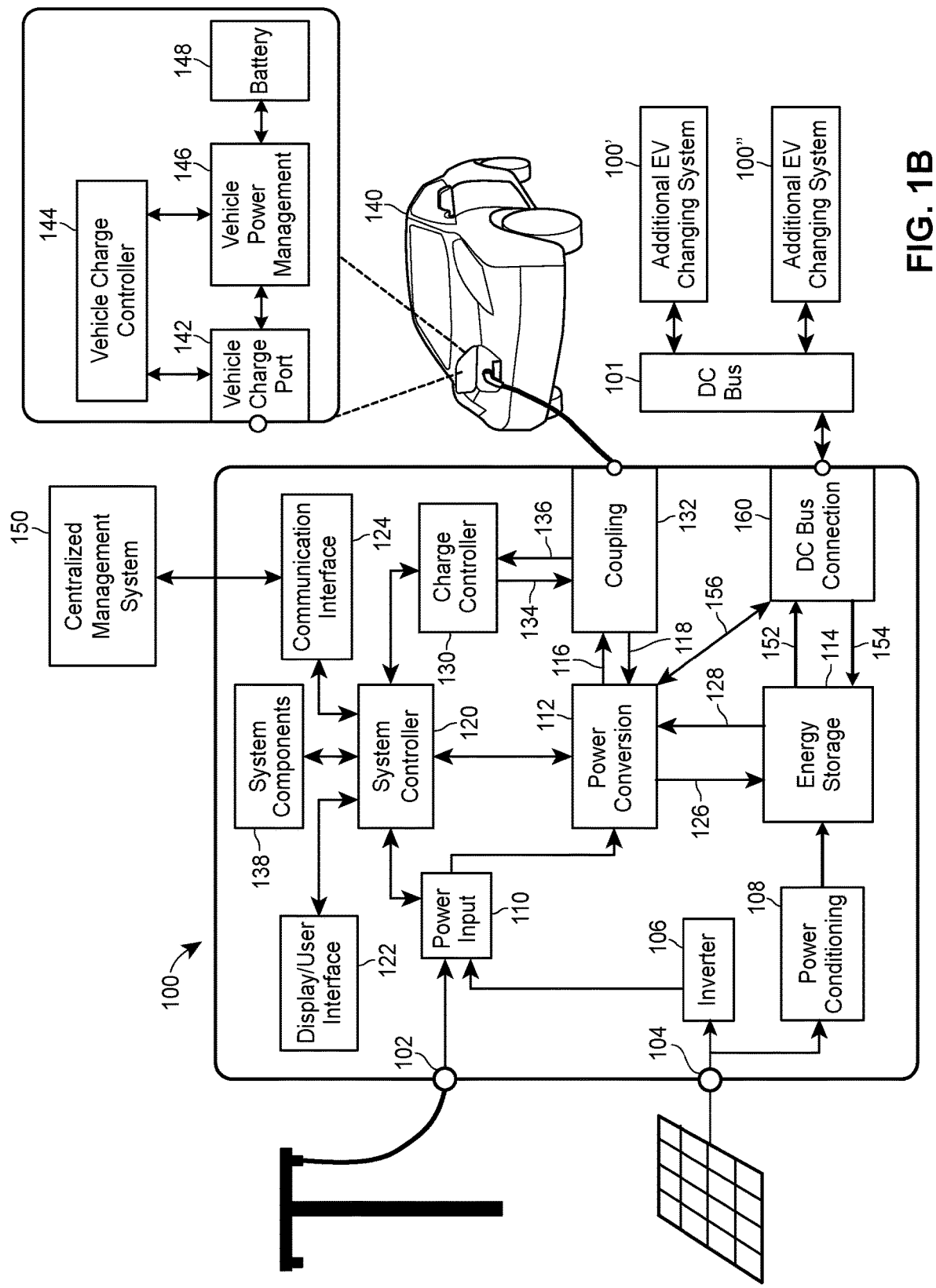
FIG. 1B illustrates a block diagram of an example of an electric vehicle charging system configured for DC charge transfer in accordance with certain aspects disclosed herein.

FIG. 1B illustrates a block diagram of an example of an EV charging system 100 configured in accordance with certain aspects disclosed herein. The EV charging system 100 may be any of the EV charging systems 100A-D at the charging site 10 illustrated in FIG. 1A. The EV charging system 100 is configured to receive electric power from a power source (e.g., electric power grid 20) via an input port 102 or 104 in order to charge an energy storage module 114 (e.g., one or more batteries), from which the EV charging system 100 provides a charging current to a vehicle 140 in order to charge a battery 148 of the vehicle 140. Such charge is provided through a vehicle coupling 132, which may comprise a charging cable utilizing one or more standard connector types (e.g., Combined Charging System (CCS) or Charge de Move (CHaDEMO) connectors). In addition to being connected to one or more power sources via the input ports 102 or 104, the EV charging system 100 includes a DC bus connection 160 to the DC bus 101 at the charging site 10. Through the DC bus connection 160, the EV charging system 100 is configured to send DC power to one or more additional EV charging systems 100' or 100" and to receive DC power from such additional EV charging systems 100' or 100", as controlled by a system controller 120 of the EV charging system 100. Although the illustrated EV charging system 100 is illustrated as communicating with a centralized management system 150, alternative embodiments of the EV charging system 100 need not be configured for such external communication. Additional or alternative components and functionality may be included in further alternative embodiments of charging systems.

The EV charging system 100 includes a power input module 110 having one or more circuits configurable to transform, condition, or otherwise modify power received from an input port 102 or 104 to provide conditioned power to a power conversion module 112. The input power received at input ports 102 or 104 may be received from an electric power grid 20, a local power generator (e.g., a solar panel or a wind turbine), or any other power source. In some embodiments, input AC power is received at an AC input port 102, while input DC power is received at a DC input port 104 (e.g., from photovoltaic cells or other types of DC power sources). The DC input port 104 may be connected to one or more of an inverter module 106 or a power conditioning module 108 for the input DC power. In further embodiments, DC current received via DC input port 104 is converted to an AC current by an inverter module 106, and the AC current is then provided to power input module 110. The power input module 110 may combine AC or DC current received from multiple sources. Similarly, the power input module 110 may direct AC or DC current received from multiple sources to individual circuits or sections of the power conversion module 112. In some embodiments, the power input module 110 may include a rectifier to convert AC current received at an input port 102 or 104 into DC current to be provided to the power conversion module 112. In further embodiments, DC current received via DC input port 104 may instead be provided to a power conditioning module 108 that may include voltage level converting circuits, filters, and other conditioning circuits to provide a charging current to the energy storage module 114.

The power conversion module 112 includes some combination of one or more AC-to-DC. DC-to-DC, and/or DC-to-AC converters for efficient conversion of AC or DC input power received from a power utility or other source at input port 102 or 104 via the power input module 110 to a DC energy storage current 126 provided to the energy storage module 114, which stores the power until needed to provide a charging current 116 to a vehicle 140. In some embodiments, the power conversion module 112 includes an AC-to-DC conversion circuit that generates a DC energy storage current 126 that is provided to an energy storage module 114. Alternatively, the power input module 110 may include an AC-to-DC conversion circuit to generate a DC current from an input AC electric power. In further embodiments, the energy storage module 114 includes high-capacity batteries that have a storage capacity greater than a multiple of the storage capacity in the EVs to be charged (e.g., three times, five times, or ten times an expected vehicle battery capacity). The storage capacity of the energy storage module 114 may be configured based on the expected average charge per charging event, which may depend upon factors such as the types of vehicles charged, the depletion level of the vehicle batteries when charging starts, and the duration of each charging event. For example, a retail parking site may have more charging events of shorter duration, while a commuter train parking lot may have fewer charging events of longer duration. In various embodiments, the storage capacity of the energy storage module 114 may be configured based on maximum expected charging offset by power received from an electric utility. In some embodiments, the storage capacity of each of the energy storage modules 114 of the EV charging systems 100 and any external batteries 30 at a charging site 10 may be configured to ensure a total charge stored at the charging site 10 is sufficient for an expected maximum load due to vehicle charging. In further embodiments, the power received from an electric utility may be limited to power available during low-demand times, such as off-peak or low-priced periods of the day. The power input module 110 may be configured to block or disconnect inflows of power during peak or high-priced periods of the day. In some embodiments, the power input module 110 may be configured to enable power reception during peak periods to ensure continued operation of the EV charging system 100 when power levels in the energy storage module 114 are unexpectedly low.

In some embodiments, the power conversion module 112 may include one or more DC-to-DC conversion circuits that receive DC current 128 at a first voltage level from the energy storage module 114 and drive a charging current 116 to a vehicle 140 through a vehicle coupling 132 to supply a vehicle 140 with the charging current 116 via a vehicle charge port 142. The vehicle coupling 132 serves as an electrical interconnect between the EV charging system 100 and the vehicle 140. In various embodiments, such vehicle coupling 132 comprises a charging head and/or a charging cable. For example, the vehicle coupling 132 may comprise a charging cable having a standard-compliant plug for connection with a vehicle charge port 142 of vehicles 140. The vehicle coupling 132 may include both a power connection for carrying the charging current 116 and a communication connection for carrying electronic communication between the charge controller 130 and the vehicle 140. In some embodiments, the EV charging system 100 may comprise multiple vehicle couplings 132, and the power conversion module 112 may include a corresponding number of DC-to-DC conversion circuits specific to each of the multiple couplings. According to some embodiments, the power conversion module 112 may be further configured to receive a reverse current 118 from a vehicle 140 via the vehicle coupling 132, which reverse current 118 may be used to provide a DC energy storage current 126 to add energy to the energy storage module 114. In some examples, the power conversion module 112 includes one or more inverters that convert the DC current 128 to an AC current that can be provided as the charging current 116.

A charge controller 130 controls the charging current 116 and/or reverse current 118 through each vehicle coupling 132. To control charging or discharging of the vehicle 140, the charge controller 130 comprises one or more logic circuits (e.g., general or special-purpose processors) configured to execute charging control logic to manage charging sessions with vehicle 140. Thus, the charge controller 130 is configured to communicate with the system controller 120 to control the power conversion module 112 to provide the charging current 116 to the vehicle 140 or to receive the reverse current 118 from the vehicle 140 via the vehicle coupling 132. In some instances, the charge controller 130 may include power control circuits that further modify or control the voltage level of the charging current 116 passed through the vehicle coupling 132 to the vehicle 140. The charge controller 130 also communicates via the vehicle coupling 132 with a vehicle charge controller 144 within the vehicle 140 to manage vehicle charging. Thus, the charge controller 130 communicates with the vehicle charge controller 144 to establish, control, and terminate charging sessions according to EV charging protocols (e.g., CCS or CHaDEMO). The charge controller 130 may be communicatively connected with the vehicle coupling 132 to provide output signals 134 to the vehicle charge controller 144 and to receive input signals 136 from the vehicle charge controller 144.

A system controller 120 is configured to control operations of the EV charging system 100 by implementing control logic using one or more general or special-purpose processors. The system controller 120 is configured to monitor and control power levels received by the power input module 110, power levels output through the charging current 116, energy levels in the energy storage module 114, and charge received from or output to the DC bus 101 via the DC bus connection 160. The system controller 120 is further configured to communicate with and control each of the one or more charge controllers 130, as well as controlling the power conversion module 112. For example, the system controller 120 is configured to control the power conversion module 112 and the charge controller to supply a charging current 116 to the vehicle coupling 132 in response to instructions from the charge controller 130. As discussed further herein, the system controller 120 is also configured to control (either separately or in coordination with the centralized management system 150) charge transfers to manage energy levels of the EV charging system 100 in relation to additional EV charging systems 100' and 100" at the charging site 10.

The system controller 120 controls charge transfers by determining occurrence of a triggering condition for a charge transfer and controlling a response to such triggering condition in order to provide or receive DC power via a direct connection with one or more additional EV charging systems 100' or 100" provided by the DC bus 101. Thus, the system controller 120 controls receiving DC input from and providing DC output to the DC bus 101 via a DC bus connection 160 of the EV charging system 100 in order to effect charge transfers at the charging site 10. The DC bus connection 160 serves as an inter-charger connection of the EV charging system 100 and is configured to connect the EV charging system 100 to the DC bus 101 at the charging site 10 as a direct connection for the exchange of DC power between the EV charging system 100 and additional EV charging systems 100' and 100" (e.g., other EV charging systems of the EV charging systems 100A-D) at the charging site 10, as well as with any external batteries 30 at the site 10 (as illustrated in FIG. 1A). In some embodiments, the DC bus connection 160 receives and provides DC power via a DC link 156 with the power conversion module 112, with the power conversion module 112 being controlled by the system controller 120 to manage any voltage or current requirements of the energy storage module 114 or the DC bus 101. In additional or alternative embodiments, the DC bus connection 160 may directly interface with the energy storage module 114 in order to provide a DC output current 152 from the energy storage module 114 to the DC bus 101 and to provide a DC input current 154 from the DC bus 101 to the energy storage module 114, as controlled by the system controller 120.

The system controller 120 is also configured to communicate with other various system components 138 of the EV charging system 100 (e.g., other controllers or sensors coupled to the energy storage module 114 or other components of the EV charging system 100) in order to receive operating data and to control operation of the system via operation of such system components 138. For example, the system controller 120 may monitor temperatures within the EV charging system 100 using the system components 138 and may be further configured to mitigate increases in temperature through active cooling or power reductions using the same or different system components 138. Likewise, the system controller 120 communicates with a user interface module 122 (e.g., a touchscreen display) and a communication interface module 124 (e.g., a network interface controller) to provide information and receive control commands. Each communication interface module 124 may be configured to send and receive electronic messages via wired or wireless data connections, which may include portions of one or more digital communication networks.

The system controller 120 is configured to communicate with the components of the EV charging system 100, including power input module 110, power conversion module 112, the user interface module 122, the communication interface module 124, the charge controller 130, and the system components 138 over one or more data communication links. The system controller 120 may also be configured to communicate with external devices, including a vehicle 140 via the vehicle coupling 132, one or more additional EV charging systems 100' and 100" via the centralized management system 150, one or more external batteries 30, or a site meter 22. The system controller 120 may manage, implement or support one or more data communication protocols used to control communication over the various communication links, including wireless communication or communication via a local router 42. The data communication protocols may be defined by industry standards bodies or may be proprietary protocols.

The user interface module 122 is configured to present information related to the operation of the EV charging system 100 to a user and to receive user input. The user interface module 122 may include or be coupled to a display with capabilities that reflect intended use of the EV charging system 100. In one example, a touchscreen may be provided to present details of charging status and user instructions, including instructions describing the method of connecting and disconnecting a vehicle 140. The user interface module 122 may include or be coupled to a touchscreen that interacts with the system controller 120 to provide additional information or advertising. The system controller 120 may include or be coupled to a wireless communication interface that can be used to deliver a wide variety of content to users of the EV charging system 100, including advertisements, news, point-of-sale content for products/services that can be purchased through the user interface module 122. The display system may be customized to match commercial branding of the operator, to accommodate language options and for other purposes. The user interface module 122 may include or be connected to various input components, including touchscreen displays, physical input mechanisms, identity card readers, touchless credit card readers, and other components that interact through direct connections or wireless communications. The user interface module 122 may further support user authentication protocols and may include or be coupled to biometric input devices such as fingerprint scanners, iris scanners, facial recognition systems and the like.

In some embodiments, the energy storage module 114 is provisioned with a large battery pack, and the system controller 120 executes software to manage input received from a power source to the battery pack based upon demand level data (e.g., demand or load data from an electric power grid 20 or site meter 22), such that power is drawn from the power source to charge the battery pack at low-load time periods and to avoid drawing power from the grid during peak-load hours. The software may be further configured to manage power output to provide full, fast charging power in accordance with usage generated by monitoring patterns of usage by the EV charging system 100. The use of historical information can avoid situations in which the battery pack becomes fully discharged or depleted beyond a minimum energy threshold. For example, charging may be limited at a first time based upon a predicted later demand at a second time, which later demand may be predicted using historical information. This may spread limited charging capacity more evenly among vehicle throughout the course of a day or in other situations in which battery pack capacity is expected to be insufficient to fully charge all EVs over a time interval, taking account of the ability to add charge to the energy storage module 114.

In further embodiments, the system controller 120 executes software (either separately or in coordination with the centralized management system 150) to manage energy draw and use by controlling charging and discharging over time among multiple EV charging systems 100 at the charging site 10. Thus, the charge drawn from the power source may be limited or avoided during peak-load hours by charge transfer between the EV charging system 100 and one or more additional EV charging systems 100' and 100" via the DC bus 101 at the charging site 10, effectively pooling the energy stored in the batteries of all of the charging systems at the charging site 10. As noted above, in some embodiments, the charging site 10 may include one or more external batteries 30 connected to the DC bus 101. In such embodiments, the systems controller 120 and/or the centralized management system 150 may further manage energy inflow and outflow at the charging site 10 by controlling selective charging and discharging such batteries at appropriate time periods to avoid or reduce total power draw of the charging site 10 from the power source during peak-demand or other high-demand times by charging the batteries of the EV charging systems 100 and the external batteries 30 during low-demand times. In some such embodiments, such energy management enables the EV charging system 100 to continue charging vehicles 140 even when the power source is disconnected or unavailable (e.g., when a local power grid is down). As discussed further elsewhere herein, the systems controllers 120 of the EV charging systems 100 and/or the centralized management system 150 may further manage site-wide energy use by controlling charge transfers based upon differential charge levels or discharge levels associated with differential utilization of the various EV charging system 100 at the charging site 10 in order to effect charge balancing or to ensure sufficient charge availability for charging vehicle 140 at one or more of the EV charging systems 100.

In some embodiments, the EV charging system 100 may be configured with two or more vehicle couplings 132 to enable concurrent charging of multiple vehicles 140. The system controller 120 may be configured by a user via the user interface module 122 to support multiple modes of operation and may define procedures for charge transfer or power distribution that preserve energy levels in the energy storage module 114 when multiple vehicles 140 are being concurrently charged. Charge transfers may be used to transfer power from EV charging systems 100 that have available power or are not being used to charge a vehicle 140 to EV charging systems 100 that are charging one or more vehicles 140. Distribution of power may be configured to enable fast charging of one or more vehicles 140 at the expense of other vehicles 140. In this regard, the vehicle couplings 132 may be prioritized or the system controller 120 may be capable of identifying and prioritizing connected vehicles 140. In some instances, the system controller 120 may be configured to automatically control the respective charge controllers 130 to split available power between two vehicles 140 after the second vehicle 140 is connected. The available power may be evenly split between two vehicles 140 or may be split according to priorities or capabilities. In some examples, the system controller 120 may conduct arbitration or negotiation between connected vehicles 140 to determine a split of charging capacity. A vehicle 140 may request a charging power level at any given moment based on temperature, battery charge level, and other characteristics of the vehicle 140 and its environment and to achieve maximum charge rate and minimum charging time for the current circumstances.

As illustrated, a vehicle 140 may be charged by connecting the vehicle 140 to the EV charging system 100 via a vehicle coupling 132. This may include plugging a charging cable of the EV charging system 100 into a vehicle charge port 142 of the vehicle 140. The vehicle charge port 142 is configured to receive the charging current 116 through the vehicle coupling 132 and provide such received current to a vehicle power management module 146. The vehicle charge port 142 is further configured to provide an electronic communication connection between the vehicle coupling 132 and a vehicle charge controller 144, which controls charging of the vehicle 140. The vehicle power management module 146 is controlled by the vehicle charge controller 144 to provide power to each of one or more batteries 148 of the vehicle 140 in order to charge such battery 148. In some instances, the vehicle charge port 142 includes a locking mechanism to engage and retain a portion of the vehicle coupling 132 in place during charging sessions. For example, for safety reasons, the vehicle charge controller 144 may control a locking mechanism of the vehicle charge port 142 to lock a plug of a charging cable in the vehicle charge port 142 while a charging session is active.

Figure 2A:
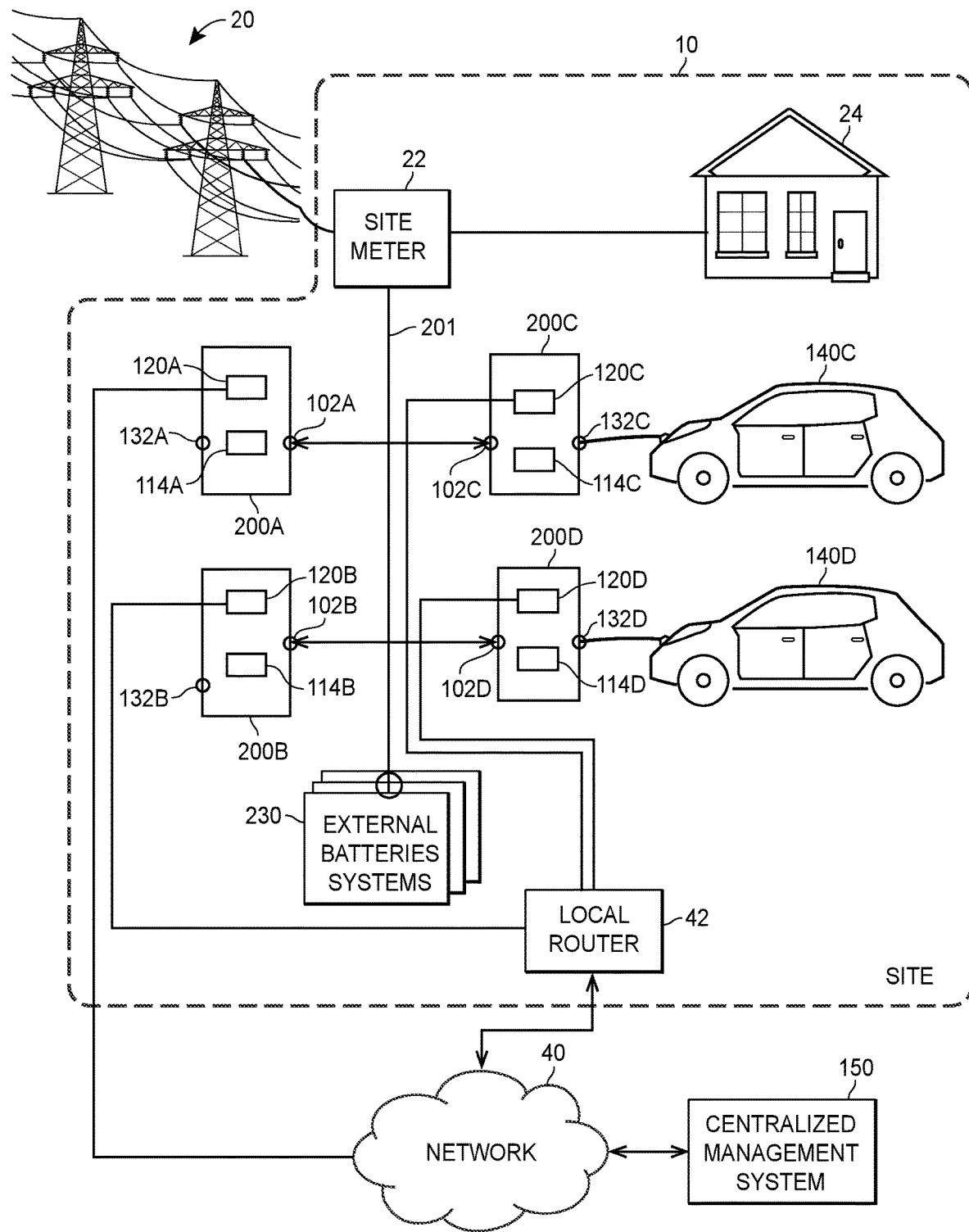
FIGS. 2A-B illustrate block diagrams of examples of a charging site configured for energy management between multiple vehicle charging systems via a local AC circuit in accordance with certain aspects disclosed herein.
Figure 2B:
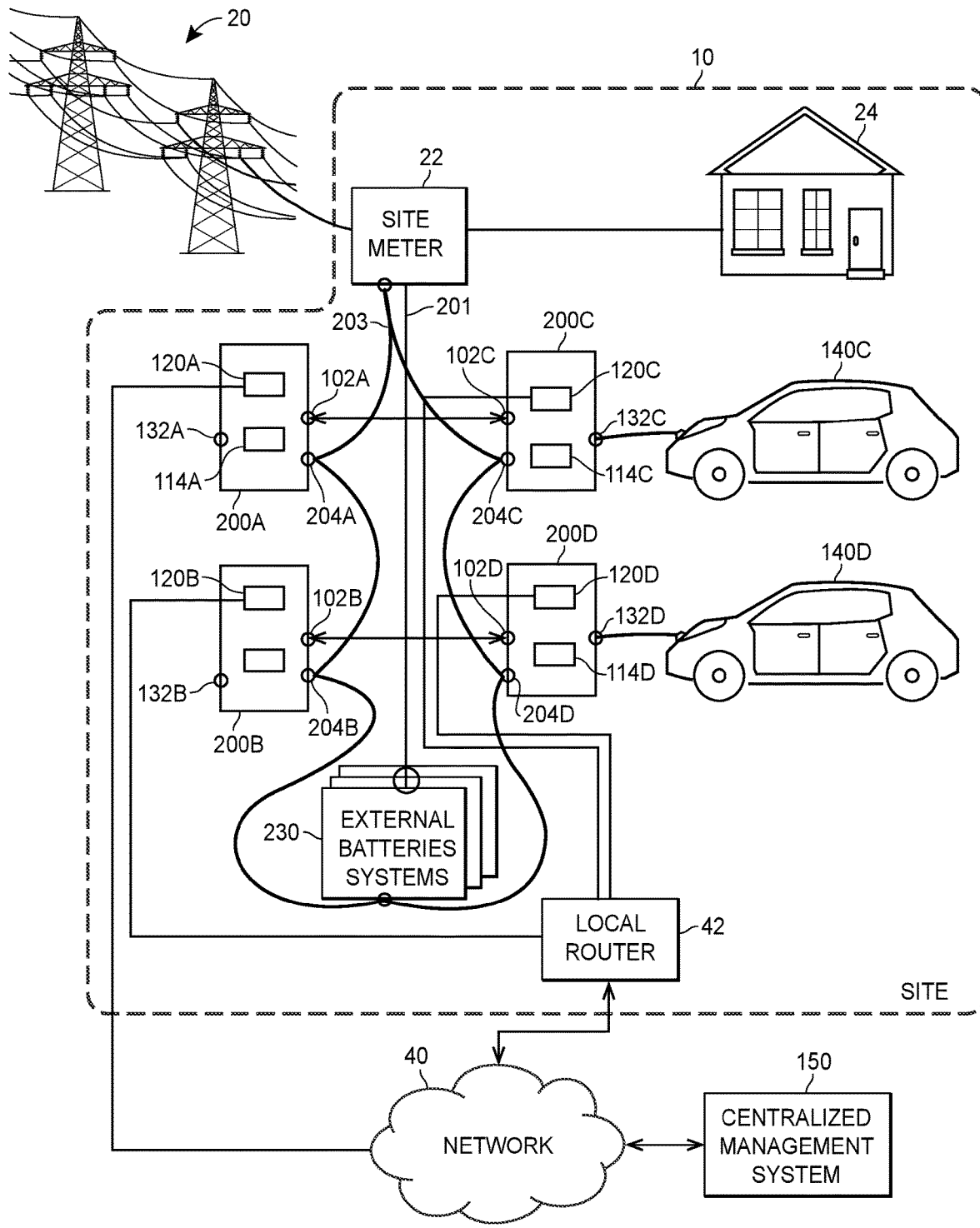

FIGS. 2A-B illustrate block diagrams of examples of a charging site 10 configured for energy management between multiple EV charging systems 200A-D via a local AC circuit 201 or 203. The configurations of the systems and components shown in FIGS. 2A-B are similar to those shown in FIG. 1A, but the EV charging systems 200A-D are configured and connected to transfer charge as AC current over a local AC circuit 201 or 203, rather than as DC current over the DC bus 101. Accordingly, each of the EV charging systems 200A-D receives input AC electric power at respective input ports 102A-D from the electric power grid 20 via the site meter 22 and a local AC circuit 201. The EV charging systems 200A-D rectify the input AC electric power into DC electric power to charge batteries of their respective energy storage modules 114A-D, which may then be used to provide charging currents to vehicles via vehicle couplings 132A-D (as shown with respect to vehicles 140C and 140D). The site meter 22 also provides AC power from the electric power grid 20 to the non-charging load 24 (e.g., commercial building electrical infrastructure) at the charging site 10. Operation of each of the EV charging systems 200A-D is controlled by their respective system controllers 120A-D, which are communicatively connected to the centralized management system 150, either directly or via the network 40, which may include a connection via a local router 42 at the charging site 10.

As discussed elsewhere herein, the EV charging systems 200A-D are configured and controlled by the system controllers 120A-D and/or the centralized management system 150 to transfer charge via local AC circuit 201 or 203 as needed to improve the balance of energy storage and energy demand at each of the EV charging systems 200A-D. To achieve such energy transfers, the DC power provided by one or more of the energy storage modules 114A-D is converted to an AC current by an inverter (not shown) and provided to the local AC circuit 201 or 203 in order to transfer energy to one or more other energy storage modules 114A-D. The respective system controllers 120A-D of the donor EV charging systems 200A-D may be configured to control the phase of the AC output power to the local AC circuit 201 or 203 to match that of the input AC electric power from the site meter 22 or of other donor EV charging systems 200A-D. As noted above, the input AC electric power may be received at each of the input ports 102A-D as a 120V or 240V single-phase or three-phase AC power supply. In various embodiments, the AC output power at input ports 102A-D or input ports 204A-D may be provided according to the same or different voltage and phase combinations.

FIG. 2A illustrates an embodiment in which one local AC circuit 201 carries both the input AC electric power from the electric power grid 20 via the site meter 22 and AC charge transferred between the EV charging systems 200A-D. In such embodiments, the respective input ports 102A-D serve to both receive AC current from the local AC circuit 201 and provide AC current to the local AC circuit 201. In some such embodiments, the local AC circuit 201 may be further connected to one or more non-charging loads 24 at the charging site 10 in order to provide AC power to such non-charging loads 24 when the electric power grid 20 is disconnected or unavailable.

FIG. 2B illustrates an embodiment in which a separate local AC circuit 203 carries AC current for energy transfers among the EV charging systems 200A-D, while the local AC circuit 201 carries the input AC electric power from the electric power grid 20. As illustrated, the local AC circuit 201 may be connected to each of the EV charging systems 200A-D via respective input ports 102A-D, while the local AC circuit 203 may be connected to each of the EV charging systems 200A-D via the respective input ports 204A-D. Such separation of the local AC circuits 201 and 203 may be advantageous in some situations by enabling charge transfers at higher power than the input AC electric power from the electric power grid 20 or while such input AC electric power is being received from the electric power grid 20. In some embodiments, the local AC circuit 203 is also connected to the site meter 22. In some such embodiments, the site meter 22 may receive AC power from the local AC circuit 203 and provide such AC power to one or more non-charging loads 24 at the charging site 10 in order to provide AC power to such non-charging loads 24 when the electric power grid 20 is disconnected or unavailable.

In some embodiments, the local AC circuit 201 and/or 203 also connects one or more external battery systems 230 to the EV charging systems 200A-D in order to increase the storage capacity at the charging site 10. Such external battery systems 230 may receive input AC power from the electric power grid 20 via local AC circuit 201 and/or from the EV charging systems 200A-D via local AC circuit 203 in order to charge one or more batteries (not shown) of the external battery systems 230. Such external battery systems 230 may include various components (not shown), including controllers and bidirectional inverters or separate rectifiers and inverters in order to convert the input AC power into DC power for storage and later convert the stored DC power into output AC power for charge transfers to one or more of the EV charging systems 200A-D.

Figure 2C:
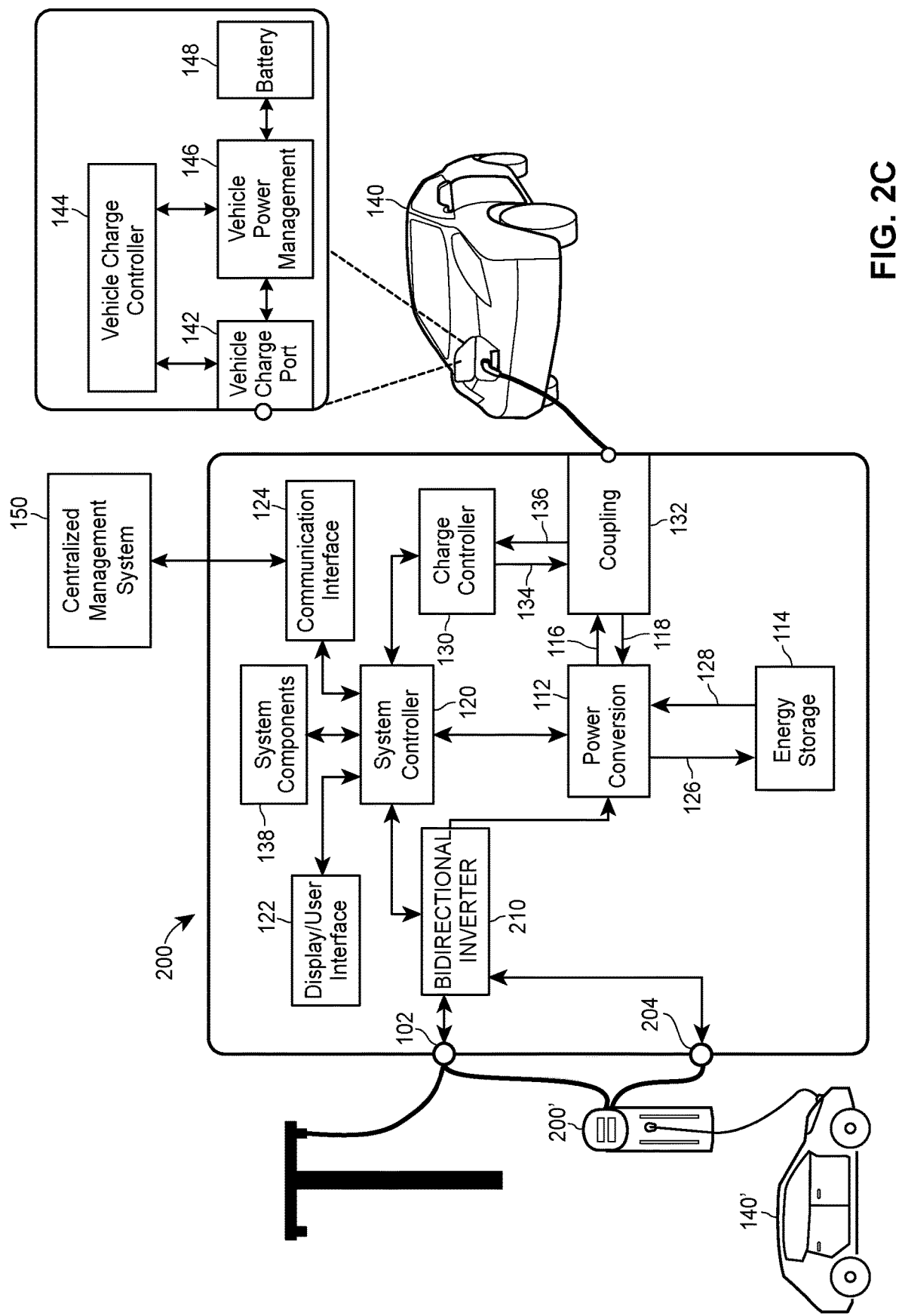
FIG. 2C illustrates a block diagram of an example of an electric vehicle charging system configured for AC charge transfer in accordance with certain aspects disclosed herein.

FIG. 2C illustrates a block diagram of an example of an EV charging system 200 configured in accordance with certain aspects disclosed herein. The EV charging system 200 may be any of the EV charging systems 200A-D at the charging site 10 illustrated in FIGS. 2A-B. The components and configuration of the EV charging system 200 shown in FIG. 2C are similar to those of the EV charging system 100 shown in FIG. 1B, but the EV charging system 200 is configured for transferring charge to an additional EV charging system 200' as AC current over a local AC circuit 201 or 203 via one or more of the input ports 102 or 104, rather than as DC current over the DC bus 101 via the DC bus connection 160. Accordingly, the power input module 110 of EV charging system 100 is replaced with a bidirectional inverter 210, which is connected to provide DC power to the power conversion module 112 and is further connected to receive input AC power from and to provide output AC power to the input ports 102 and 204. As illustrated, the EV charging system 200 also lacks the inverter module 106 and power conditioning module 108 to receive input DC electrical energy from DC input port 104 of the EV charging system 100, but such components may be included in some embodiments of the EV charging system 200. Other components of the EV charging system 200 are as described above with respect to the EV charging system 100. Additional or alternative components and functionality may be included in further alternative embodiments of charging systems.

The bidirectional inverter 210 is configured to alternatively operate in an inverter mode or in a rectifier mode at various times as controlled by the system controller 120. In the rectifier mode, the bidirectional inverter 210 converts an input AC current from a power source (e.g., the electric power grid 20 or an additional EV charging system 200' via a local AC circuit 201 or 203) into a DC current to provide to the energy storage module 114 via the power conversion module 112. In the inverter mode, the bidirectional inverter 210 convers a DC current from the energy storage module 114 via the power conversion module 112 into an output AC current to the local AC circuit 201 or 203 via an input port 102 or 204. Thus, when a triggering condition occurs to cause the EV charging system 200 to provide an AC output power to the local AC circuit 201 or 203 to transfer charge to an additional EV charging system 200' at the charging site 10 (e.g., to enable the additional EV charging system 200' to charge a vehicle 140'), the bidirectional inverter operates in the inverter mode to convert a DC current from the power conversion module 112 into the AC output power and provide such AC output power to the local AC circuit 201 or 203 via an input port 102 or 204. In some embodiments, a plurality of separate components may instead be configured to perform such functionality of the bidirectional inverter 210, such as by including one or more inverters and rectifiers in the EV charging system 200. In further embodiments, part or all of the functionality of the bidirectional inverter 210 may be incorporated into the power conversion module 112, or part or all of the functionality of the power conversion module 112 may be incorporated into the bidirectional inverter 210.

Figure 3:
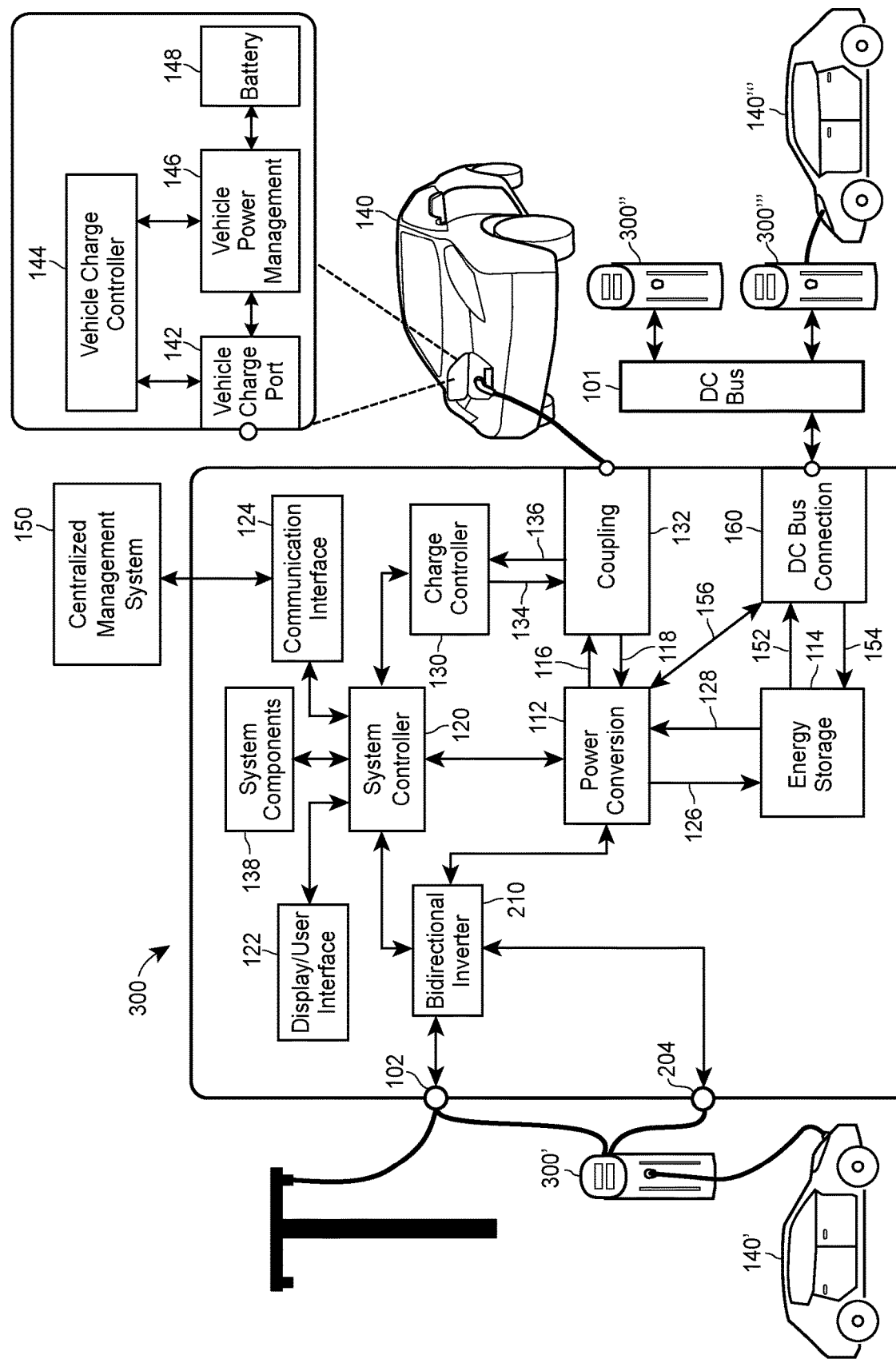
FIG. 3 illustrates a block diagram of an example of a combined electric vehicle charging system configured for both AC and DC charge transfer in accordance with certain aspects disclosed herein.

FIG. 3 illustrates a block diagram of an example of a combined EV charging system 300 configured for both AC and DC charge transfer in accordance with certain aspects disclosed herein. The EV charging system 300 may be any of the EV charging systems 100A-D or EV charging systems 200A-D at the charging sites 10 illustrated in FIG. 1A or FIGS. 2A-B. The components and configuration of the EV charging system 300 shown in FIG. 3 combine those of the EV charging system 100 shown in FIG. 1B and those of the EV charging system 200 shown in FIG. 2C. Thus, the EV charging system 300 is configured for transferring charge to additional EV charging system 300' via a local AC circuit 201 or 203 (e.g., to enable the additional EV charging system 200' to charge a vehicle 140') and for transferring charge to additional EV charging systems 300" and 300'" via DC bus 101 (e.g., to enable the additional EV charging system 300'" to charge a vehicle 140'"). As illustrated, the EV charging system 300 includes the bidirectional inverter 210 of EV charging system 200, rather than the power input module 110 of EV charging system 100. As further illustrated, the EV charging system 300 also lacks the inverter module 106 and power conditioning module 108 to receive input DC electrical energy from DC input port 104 of the EV charging system 100, but such components may be included in some embodiments of the EV charging system 300. Other components of the EV charging system 300 are as described above with respect to the EV charging system 100 or EV charging system 200. Additional or alternative components and functionality may be included in further alternative embodiments of charging systems.

Additional Description Related to Controllers

Figure 4:
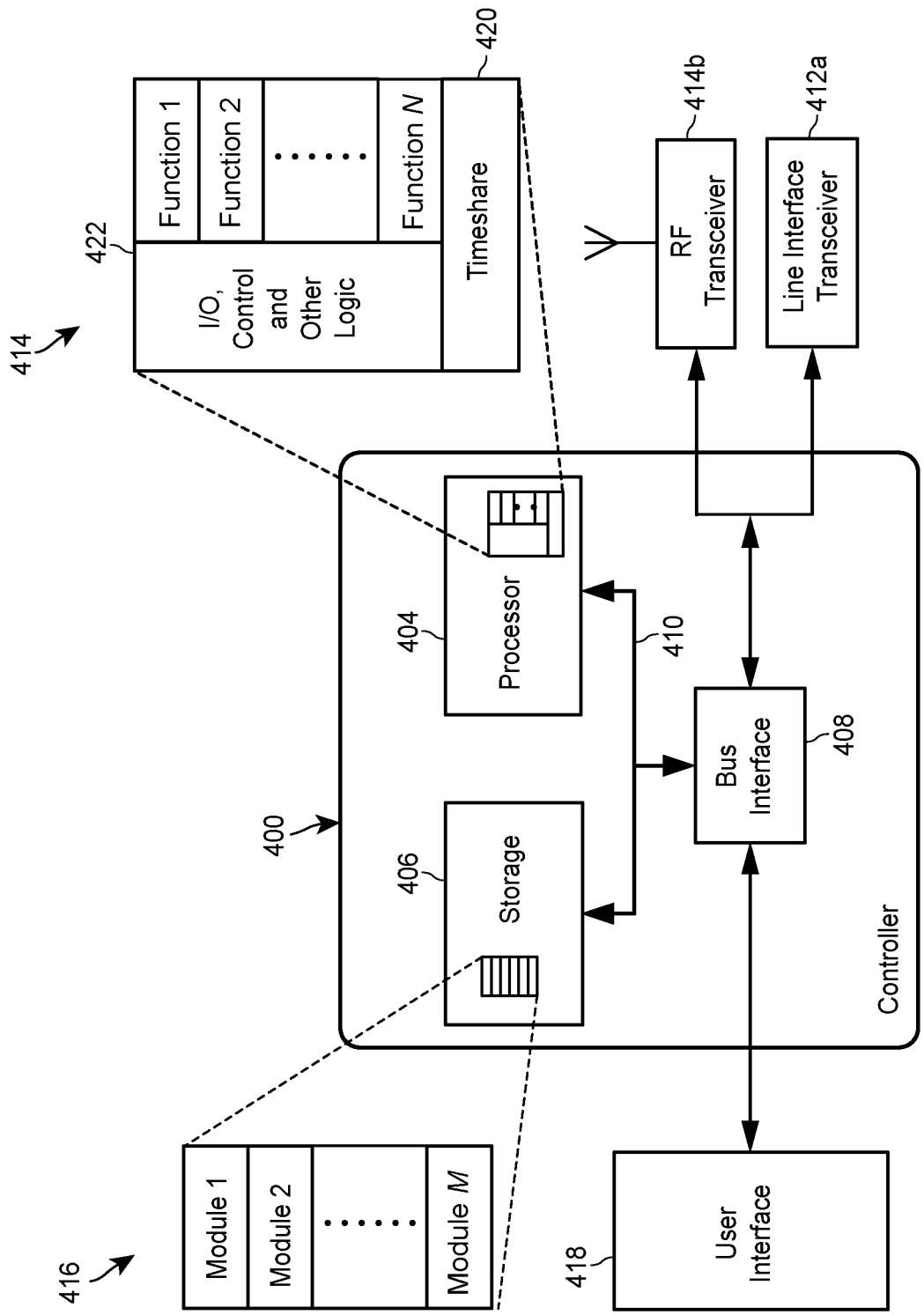
FIG. 4 illustrates a block diagram illustrating a simplified example of a hardware implementation of a controller in accordance with certain aspects disclosed herein.

FIG. 4 illustrates a block diagram illustrating a simplified example of a hardware implementation of a controller 400, such as any of the system controller 120, the charge controller 130, the vehicle charge controller 144, or the centralized management system 150 disclosed herein. In some embodiments, the controller 400 may be a controller of a site meter 22, an external battery 30, an external battery system 230, or any other component disclosed herein that implements control logic to control any aspect of the described systems and methods. The controller 400 may include one or more processors 404 that are controlled by some combination of hardware and software modules. Examples of processors 404 include microprocessors, microcontrollers, digital signal processors (DSPs), application-specific integrated circuits (ASICs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 404 may include specialized processors that perform specific functions, which may be configured by one or more of the software modules 416. The one or more processors 404 may be configured through a combination of software modules 416 loaded during initialization and may be further configured by loading or unloading one or more software modules 416 during operation.

In the illustrated example, the controller 400 may be implemented with a bus architecture, represented generally by the bus 410. The bus 410 may include any number of interconnecting buses and bridges depending on the specific application of the controller 400 and the overall design constraints. The bus 410 links together various circuits including the one or more processors 404 and storage 406. Storage 406 may include memory devices and mass storage devices, any of which may be referred to herein as computer-readable media. The bus 410 may also link various other circuits, such as timing sources, timers, peripherals, voltage regulators, and power management circuits. A bus interface 408 may provide an interface between the bus 410 and one or more line interface circuits 412, which may include a line interface transceiver circuit 412a and a radio frequency (RF) transceiver circuit 412b. A line interface transceiver circuit 412a may be provided for each networking technology supported by the controller. In some instances, multiple networking technologies may share some or all of the circuitry or processing modules found in a line interface circuit 412, such as line interface transceiver circuit 412a for wired communication and RF transceiver circuit 412b for wireless communication. Each line interface circuit 412 provides a means for communicating with various other devices over a transmission medium. In some embodiments, a user interface 418 (e.g., touchscreen display, keypad, speaker, or microphone) may also be provided, and may be communicatively coupled to the bus 410 directly or through the bus interface 408.

A processor 404 may be responsible for managing the bus 410 and for general processing that may include the execution of software stored in a computer-readable medium that may include the storage 406. In this respect, the processor 404 of the controller 400 may be used to implement any of the methods, functions, and techniques disclosed herein. The storage 406 may be used for storing data that is manipulated by the processor 404 when executing software, and the software may be configured to implement any of the methods disclosed herein.

One or more processors 404 in the controller 400 may execute software. Software may include instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 406 or in an external computer readable medium. The external computer-readable medium and/or storage 406 may include a non-transitory computer-readable medium. A non-transitory computer-readable medium includes, by way of example, a magnetic storage device (e.g., hard disk, floppy disk, magnetic strip), an optical disk, a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. Portions of the computer-readable medium or the storage 406 may reside in the controller 400 or external to the controller 400. The computer-readable medium and/or storage 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 406 may maintain software maintained or organized in loadable code segments, modules, applications, programs, etc., which may be referred to herein as software modules 416. Each of the software modules 416 may include instructions and data that, when installed or loaded on the controller 400 and executed by the one or more processors 404, contribute to a run-time image 414 that controls the operation of the one or more processors 404. When executed, certain instructions may cause the controller 400 to perform functions in accordance with certain methods, algorithms, and processes described herein.

Some of the software modules 416 may be loaded during initialization of the controller 400, and these software modules 416 may configure the controller 400 to enable performance of the various functions disclosed herein. For example, some software modules 416 may configure internal devices or logic circuits 422 of the processor 404, and may manage access to external devices such as line interface circuits 412, the bus interface 408, the user interface 418, timers, mathematical coprocessors, etc. The software modules 416 may include a control program or an operating system that interacts with interrupt handlers and device drivers to control access to various resources provided by the controller 400. The resources may include memory, processing time, access to the line interface circuits 412, the user interface 418, etc.

One or more processors 404 of the controller 400 may be multifunctional, whereby some of the software modules 416 are loaded and configured to perform different functions or different instances of the same function. For example, the one or more processors 404 may additionally be adapted to manage background tasks initiated in response to inputs from the user interface 418, the line interface circuits 412, and device drivers. To support the performance of multiple functions, the one or more processors 404 may be configured to provide a multitasking environment, whereby each of a plurality of functions is implemented as a set of tasks serviced by the one or more processors 404 as needed or desired. In one example, the multitasking environment may be implemented using a timesharing program 420 that passes control of a processor 404 between different tasks, whereby each task returns control of the one or more processors 404 to the timesharing program 420 upon completion of any outstanding operations or in response to an input such as an interrupt. When a task has control of the one or more processors 404, the processing circuit is effectively specialized for the purposes addressed by the function associated with the controlling task. The timesharing program 420 may include an operating system, a main loop that transfers control on a round-robin basis, a function that allocates control of the one or more processors 404 in accordance with a prioritization of the functions, or an interrupt-driven main loop that responds to external events by providing control of the one or more processors 404 to a handling function.

Exemplary Methods for Energy Management at a Charging Site

Figure 5:
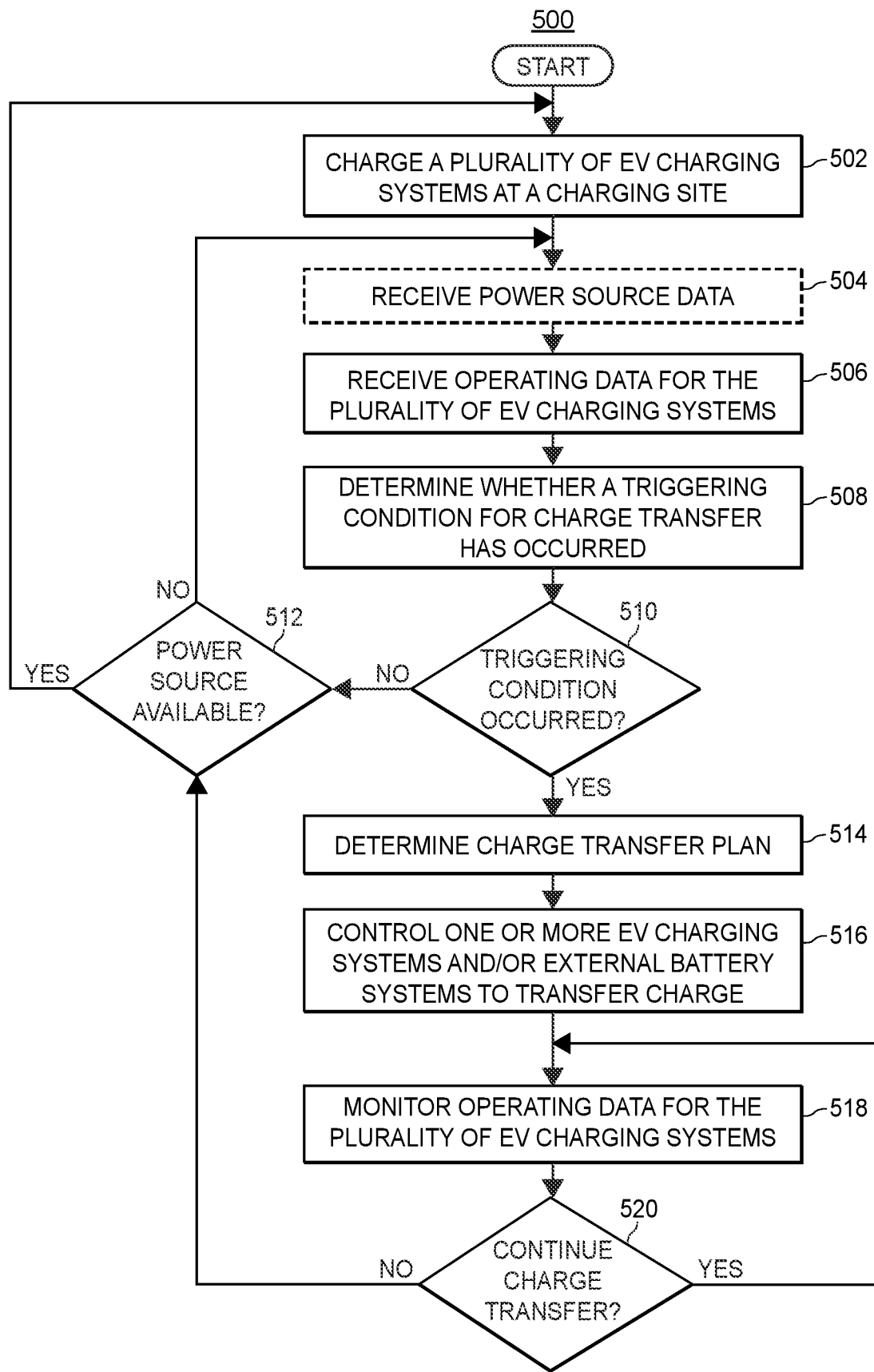
FIG. 5 illustrates a flow diagram of an example energy management method for monitoring a charging site and controlling charge transfers between multiple vehicle charging stations in accordance with certain aspects disclosed herein.

FIG. 5 illustrates a flow diagram of an example energy management method 500 for monitoring a charging site 10 and controlling charge transfers between multiple EV charging systems in accordance with certain aspects disclosed herein. The charging site 10 may include any combination of one or more of the DC bus 101, the local AC circuit 201, or the local AC circuit 203 as described above. In various embodiments, all of the EV charging systems at the charging site are EV charging systems 100 or are EV charging systems 200. In alternative embodiments, one or more EV charging systems 300 may be connected with either or both one or more EV charging systems 100 or one or more EV charging systems 200 at the charging site 10. The exemplary method 500 may be implemented by one or more system controllers 120 of corresponding EV charging systems and/or a centralized management system 150 in order to determine and effect charge transfers among the EV charging systems.

The example energy management method 500 begins with charging the plurality of EV charging systems at the charging site 10 from a power source of the charging site 10 in order to store energy at each of the plurality of EV charging systems (block 502). In some embodiments, power source data regarding the availability or other information about the power source may be received (block 504). Operating data regarding the operating status or parameters of each of the plurality of EV charging systems is also obtained (block 506). Based upon the operating data and/or power source data, it is determined whether a triggering condition for a charge transfer has occurred (block 508). When such a triggering condition has not occurred (block 510) and the power source is available (block 512), the EV charging systems continue to charge (block 502). When such a triggering condition has not occurred (block 510) but the power source is not available (block 512), the power source data and operating data continues to be monitored (block 504 and 506). When such triggering condition has occurred (block 510), a charge transfer plan is determined (block 514), and one or more of the EV charging systems and/or external battery systems are controlled to effect the charge transfer (block 516). Operating data is monitored (block 518) while the charge transfer is ongoing (block 520). When the charge transfer is complete or otherwise discontinued (block 520), the EV charging systems continue charging from the power source (block 502) if the power source is available (block 512), or the power source data and operating data continues to be monitored (block 504 and 506) if the power source is unavailable (block 512). Additional or alternative aspects may be included in some embodiments.

At block 502, the centralized management system 150 and/or one or more system controllers 120 associated with the EV charging systems control the EV charging systems to charge from the power source of the charging site 10 (e.g., the electric power grid 20). In some embodiments, the power source provides an AC or DC input electric power at a lower voltage or lower wattage than the output charging current used to charge vehicles (e.g., vehicles 140). Therefore, charging the batteries of the EV charging systems may occur slowly over a substantially longer time than discharging occurs. In embodiments in which the charging site 10 includes one or more external batteries 30 or external battery systems 230, the batteries of such components may also be charged from either the power source of the charging site 10 or from an AC or DC output from one or more of the EV charging systems.

At block 504, in some embodiments, the centralized management system 150 and/or one or more system controllers 120 associated with the EV charging systems obtain power source data regarding the power source. Such power source data may include an indication of whether the power source is available (e.g., whether the electric power grid 20 is connected and powered to provide electric power to the charging site 10). Such power source data may further include demand data regarding load on or demand charges for the power source. In some embodiments, the power source data may further include predictions of future availability or demand, as well as current availability or demand. For on-site power sources such as solar or wind power generators, predictions of future availability may include predicting future environmental conditions and output levels. Thus, the power source data may include one or more of the following charging site conditions: current availability of input electric power from the power source, predicted future availability of input electric power from the power source, current demand for electric power from the power source, or predicted future demand for electric power from the power source. In various embodiments, the power source data may be received by an electronic message from the site meter 22, a server or controller associated with the power source, or monitoring components (e.g., sensors) disposed at the charging site 10 or at an interconnect of the power source near the charging site 10.

At block 506, the centralized management system 150 and/or one or more system controllers 120 associated with the EV charging systems obtain operating data for the plurality of EV charging systems at the charging site 10. Such operating data may include data regarding an operational status of each EV charging system (e.g., whether operating normally, in need of repair, charging, discharging, or at full charge), a charge level of the one or more batteries of each EV charging system, a charging rate of each EV charging system regarding charging from the power source, a discharging rate of each EV charging system relating to vehicle charging, or an energy transfer rate of each EV charging system relating to energy transfers among the EV charging systems. The charging, discharging, and energy transfer rates may include current rates or potential rates (e.g., maximum available rates). In embodiments in which the charging site 10 includes one or more external batteries 30 or external battery systems 230, corresponding operating data for such components may also be obtained. The operating data may be obtained by receiving (either directly or indirectly) electronic messages from the respective system controllers 120 the EV charging systems, by receiving (either directly or indirectly) electronic messages from the centralized management system 150, by detecting current operating conditions of an EV charging system from sensors disposed within the EV charging system, by accessing operating data stored in a local or remote database, or by generating predictions of future operating data based upon current operating data or stored past operating data. For example, each of the EV charging systems may send electronic messages containing operating data regarding their own current operating conditions to the centralized management system 150 or to each other EV charging system at the charging site 10.

At block 508, the centralized management system 150 and/or one or more system controllers 120 associated with the EV charging systems determine whether a triggering condition for a charge transfer via one or more of the DC bus 101, the local AC circuit 201, or the local AC circuit 203 has occurred. Such determination of occurrence of a triggering condition may be determined based upon the operating data and/or the power source data by a system controller 120 or by the centralized management system 150. In some embodiments, the centralized management system 150 determines occurrence of a triggering condition for a charge transfer at the charging site 10, then sends a command to one or more of the EV charging systems in an electronic message to cause the one or more EV charging systems to effect the charge transfer. For such one or more EV charging systems, determination of occurrence of the triggering condition may comprise detecting receipt of such command from the centralized management system 150. In further embodiments, the system controllers 120 of the EV charging systems may determine occurrence of the triggering condition based upon their own operating data and/or operating data from the system controllers 120 of the other EV charging systems at the charging site 10. In some such embodiments, the system controllers 120 may exchange operating data with other system controllers 120 of the EV charging systems at the charging site 10 to facilitate determination of the triggering condition by all the system controllers 120 at the charging site 10. In further such embodiments, the system controllers 120 may instead determine triggering conditions based upon the operating data of their own respective EV charging systems (and, in some such embodiments, base upon the power source data) in order to generate and transmit charge transfer requests to the other system controllers 120 of the EV charging systems at the charging site 10 (either directly or via the centralized management system 150).

In some embodiments, occurrence of the triggering condition may include detection of disconnection of the power source from the EV charging systems (e.g., disconnection of the electric power grid 20 from the local AC circuit 201). Detecting disconnection of the power source may include detecting receipt of an electronic message indication such disconnection from the site meter 22 or from the centralized management system 150. Alternatively, detecting disconnection of the power source may include detecting an absence of input electric power at the input ports 102 and/or 104 of one or more of the EV charging systems. In further embodiments, determining occurrence of the triggering condition may include determining a demand level for the power source exceeds a threshold demand level (e.g., determining the load or demand charges of the electric power grid 20 exceeding thresholds associated with high demand relative to supply of power to the grid). An indication of such demand level or an indication that the demand level exceeds to the threshold demand level may be received from the site meter 22, from a server or controller associated with the power source, or from the centralized management system 150.

Occurrence of the triggering condition for the charge transfer thus includes occurrence of one or more conditions relating to the power source, the EV charging systems, and/or any external batteries 30 or external battery systems 230. As discussed further below with respect to the example charge balancing method 600 illustrated in FIG. 6, in some embodiments, the triggering condition may comprise a determination of charge imbalance between batteries of the EV charging systems exceeding a threshold charge differential or of a discharge imbalance between charging currents output by the EV charging systems exceeding a threshold discharge differential.

In some embodiments, the triggering condition may be associated with one or more external batteries 30 or external battery systems 230 at the charging site 10, which triggering condition may be a different triggering condition employing a separate set of thresholds or rules for determining when to transfer charge to or from the one or more external batteries 30 or external battery systems 230. For example, the triggering conditions for transferring charge to the one or more external batteries 30 or external battery systems 230 may comprise determining sufficient availability of the power source or a sufficient charge at one or more of the EV charging systems (which may be determined by a higher threshold than that used for inter-charger transfers between EV charging systems), thus indicating sufficient power at the EV charging systems to cause storage of additional power at the one or more external batteries 30 or external battery systems 230. Similarly, the triggering conditions for transferring charge from the one or more external batteries 30 or external battery systems 230 to one or more EV charging systems may be determined using lower thresholds for such charge transfers because the external batteries 30 or external battery systems 230 cannot directly provide charging current to charge vehicles 140. Since the one or more external batteries 30 or external battery systems 230 are disposed at the charging site 10 to provide power to the EV charging systems, it may be unnecessary to reserve power in the one or more external batteries 30 or external battery systems 230, while it may be desirable to maintain a minimum reserve power in each of the EV charging systems in some situations.

At block 510, when no triggering condition for a charge transfer has occurred, the example energy management method 500 continues at block 512. At block 512, the centralized management system 150 and/or one or more system controllers 120 associated with the EV charging systems determine whether the power source is available for charging the EV charging systems and any external batteries 30 or external battery systems 230 at the charging site 10 based upon the power source data. If the power source is determined to be available or if no power source data is available, the example energy management method 500 continues with charging or attempting to charge the EV charging systems using the power source at block 502. If the power source is determined not to be available based upon the power source data, the example energy management method 500 continues with obtaining power source data at block 504 and operating data at block 506. In some embodiments, determining the power source is not available may include determining that the power source is disconnected from the EV charging systems (e.g., by disconnection of the electric power grid 20 at the site meter 22 to avoid peak-demand charges). In further embodiments, determining the power source is not available may include determining that a demand level for electric power from the power source exceeds a threshold demand level (e.g., by receiving an indication of power source load or demand charges exceeding thresholds). In some such embodiments, the threshold demand level may be dynamically determined based upon charge levels and vehicle charging demand at the plurality of EV charging systems.

At block 510, when a triggering condition for a charge transfer has occurred, the example energy management method 500 continues at block 514. At block 514, the centralized management system 150 and/or one or more system controllers 120 associated with the EV charging systems determine a charge transfer plan for transferring charge to or from at least one EV charging system via one or more of the DC bus 101, the local AC circuit 201, or the local AC circuit 203. The charge transfer plan defines the parameters of the charge transfer, including identifying each donor EV charging system and each recipient EV charging system and the timing and extent of the charge to be transferred. The charge transfer plan may include transferring charge as an AC or DC current between EV charging systems at the charging site 10. In some embodiments, the charge transfer plan may include transferring DC current to or from one or more external batteries 30 via the DC bus 101. In further embodiments, the charge transfer plan may include transferring AC current to or from one or more external battery systems 230 via the local AC circuit 201 or 203. In some embodiments, the charge transfer plan may be determined by the system controllers 120 of the one or more EV charging systems that will donate or receive a charge to effect the charge transfer, which may include coordination through sending electronic messages between the system controllers 120 to define the parameters of the charge transfer.

At block 516, the centralized management system 150 and/or one or more system controllers 120 associated with the EV charging systems cause the one or more EV charging systems and any external batteries 30 or external battery systems 230 to transfer the charge according to the parameters of the charge transfer plan in order to effect the charge transfer. In some embodiments, the centralized management system 150 sends an electronic message to the system controller 120 of each donor EV charging system and each recipient EV charging system to cause the respective system controllers 120 to control the EV charging systems to effect the charge transfer. In further embodiments, the centralized management system 150 sends an additional electronic message to each external battery system 230 involved in the charge transfer plan to effect the charge transfer. To effect the charge transfer, the system controller 120 of each donor EV charging system controls the such EV charging system to either (i) provide a DC output power from its one or more batteries (e.g., the energy storage module 114) to the DC bus connection 160 in order to provide the DC output power to the DC bus 101 or (ii) provide a DC output power from its one or more batteries (e.g., the energy storage module 114) to the bidirectional inverter 210 and convert the DC output to an AC output power to provide the AC output power to the local AC circuit 201 or 203 via an input port 102 or 204. Correspondingly, to effect the charge transfer, the system controller 120 of each recipient EV charging system controls the such EV charging system to either (i) receive and charge its one or more batteries (e.g., the energy storage module 114) with a DC input power from the DC bus 101 via the DC bus connection 160 or (ii) receive an AC input power from the local AC circuit 201 or 203 via an input power 102 or 204 and convert the AC input power by the bidirectional inverter 210 into a DC input power to charge its one or more batteries (e.g., the energy storage module 114). In embodiments in which the charge transfer plan includes one or more external batteries 30 or external battery systems 230, a controller associated with each such external battery 30 or external battery system 230 may control one or more batteries thereof to either provide or receive DC power to or from the DC bus 101 or AC power to or from the local AC circuit 201 or 203 to effect the charge transfer.

At block 518, the centralized management system 150 and/or one or more system controllers 120 associated with the EV charging systems monitor operating data relating to the EV charging systems at the charging site 10 during the charge transfer. At block 520, the centralized management system 150 and/or one or more system controllers 120 associated with the EV charging systems determine whether to continue the charge transfer according to the charge transfer plan based upon the current operating data. In some embodiments, the charge transfer plan may be discontinued or adjusted based upon changes in the operating data (e.g., increased availability of or reduced demand on the power source, arrival of a vehicle 140 for charging at a donor EV charging station, or departure of a vehicle 140 after charging at a recipient EV charging station). When it is determined at block 520 to continue the charge transfer, the example energy management method 500 continues to monitor the operating data at block 518. When it is determined at block 520 not to continue the charge transfer, the example energy management method 500 continues by determining whether the power source is available at block 512. If the power source is determined to be available or if no power source data is available, the example energy management method 500 continues with charging or attempting to charge the EV charging systems using the power source at block 502. If the power source is determined not to be available based upon the power source data, the example energy management method 500 continues with obtaining power source data at block 504 and operating data at block 506. The example energy management method 500 continues while the charging site 10 is operational.

Figure 6:
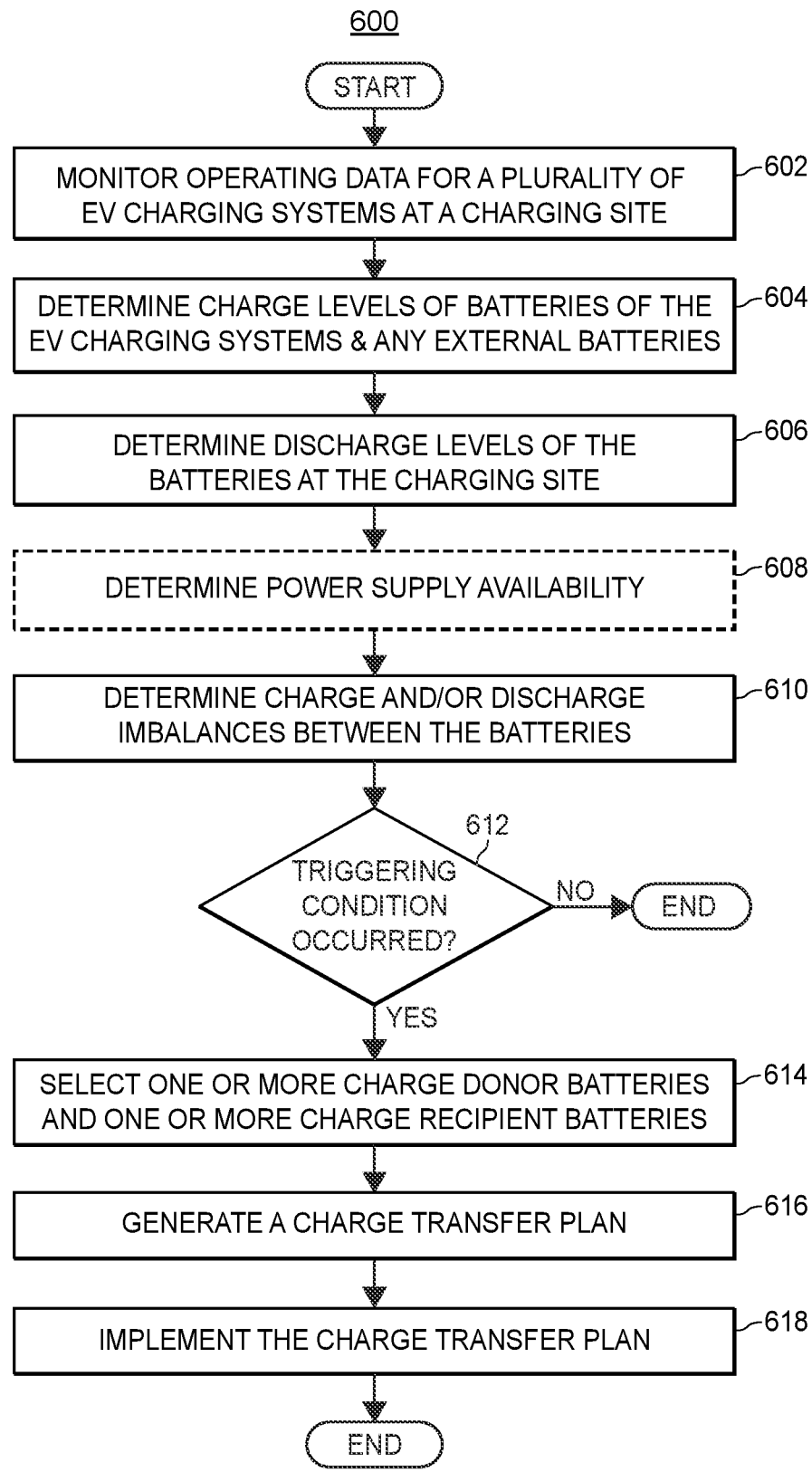
FIG. 6 illustrates a flow diagram of an example charge balancing method for determining charge imbalance and charge transfers between multiple vehicle charging stations to implement certain aspects of the example energy management method of FIG. 5 in accordance with certain aspects disclosed herein.

FIG. 6 illustrates a flow diagram of an example charge balancing method 600 for determining charge imbalance and charge transfers between multiple EV charging systems at a charging site 10 to implement certain aspects of the example energy management method 500 in accordance with certain aspects disclosed herein. The exemplary method 600 may be repeatedly implemented by one or more system controllers 120 of corresponding vehicle chargers and/or a centralized management system 150 in order to monitor the charging site 10 and to determine charge transfers among the EV charging systems in order to perform a portion of the example energy management method 500. As with the example energy management method 500, the charging site 10 may include any combination of one or more of the DC bus 101, the local AC circuit 201, or the local AC circuit 203 as described above. In various embodiments, all of the EV charging systems at the charging site are EV charging systems 100 or are EV charging systems 200. In alternative embodiments, one or more EV charging systems 300 may be connected with either or both one or more EV charging systems 100 or one or more EV charging systems 200 at the charging site 10.

The example charge balancing method 600 begins with monitoring operating data for the plurality of EV charging systems at the charging site 10 (block 602), then determining charge levels of batteries of the EV charging systems (block 604) and discharge levels of the batteries of the EV charging systems (block 606) from the operating data. In some embodiments, availability of the power supply for the charging site 10 may be determined (block 608). Based upon these determinations, one or more charge imbalances or discharge imbalances of the batteries of the EV charging systems are determined (block 610). If a triggering condition is determined to have occurred based upon such power supply availability and the determined charge and/or discharge imbalances (block 612), one or more donor batteries and recipient batteries for a charge transfer are selected (block 614). A charge transfer plan between the donor batteries and the recipient batteries is then generated (block 616). When the charge transfer plan has been implemented (block 618) or if no such triggering condition is determined to have occurred (block 612), the example charge balancing method 600 ends. Additional or alternative aspects may be included in some embodiments.

At block 602, the centralized management system 150 and/or one or more system controllers 120 associated with the EV charging systems obtain and monitor operating data for each of the plurality of EV charging systems at the charging site 10. In some embodiments, this may include system controllers 120 of the EV charging systems sending the operating data in electronic messages to the centralized management system 150 via the network 40, which may occur periodically, upon a change to the operating data, or upon receipt of a request for such operating data from the centralized management system 150. In embodiments in which the charging site 10 includes one or more external batteries 30 or external battery systems 230, corresponding operating data for such components may also be monitored.

At block 604, the centralized management system 150 and/or one or more system controllers 120 associated with the EV charging systems determine charge levels of batteries (e.g., energy storage modules 114) of the EV charging systems and any external batteries 30 or external battery systems 230 at the charging site 10. In some embodiments, the charge levels of the batteries may be determined directly as being included in the operating data. In further embodiments, the charge levels may be calculated from current flowing into and out of the batteries over time.

At block 606, the centralized management system 150 and/or one or more system controllers 120 associated with the EV charging systems determine discharge levels of the batteries of the EV charging systems at the charging site 10. The discharge levels of the batteries of the EV charging systems may be determined as a total power of the charging current provided by each of the EV charging stations to charge vehicles 140 over one or more time intervals. For example, the discharge levels may be determined for each EV charging system for both a current time interval (e.g., a current day), as well as a historical time interval (e.g., over the past month). Using both current and historical time intervals may be useful in predicting likely vehicle charging demand for each of the EV charging systems for a relevant future time interval (e.g., a remainder of the day).

At block 608, in some embodiments, the centralized management system 150 and/or one or more system controllers 120 associated with the EV charging systems determine power supply availability (e.g., whether the electric power grid 20 is connected to the EV charging systems and powered). Power source availability may be determined based upon power source data obtained from the site meter 22, a server or controller associated with the power source, or monitoring components (e.g., sensors) disposed at the charging site 10 or at an interconnect of the power source near the charging site 10. In some embodiments, determining power supply availability may include determining current availability and predicting future availability of the power source. In further embodiments, determining power supply availability may include determining a demand level for the power source, such as an indication of load on or demand charges for the power source.

At block 610, the centralized management system 150 and/or one or more system controllers 120 associated with the EV charging systems determine charge imbalances and/or discharge imbalanced between the EV charging systems at the charging site 10. The charge balances and discharge imbalances may be determined between each pair of EV charging stations at the charging site 10 in order to identify charge transfer candidates among the EV charging stations. The charge imbalances may be determined as a charge differential between the stored charge levels of the energy storage modules 114 of each of the EV charging systems. Likewise, the discharge imbalances may be determined as a discharge differential between the charging current provided to charge vehicles 140 over a predetermined time interval by each of the EV charging systems.

At block 612, the centralized management system 150 and/or one or more system controllers 120 associated with the EV charging systems determine whether a triggering condition has occurred. The triggering condition may be determined based upon one or more of the charge levels, the discharge levels, the charge or discharge imbalances, or the power supply availability. In some embodiments, occurrence of the triggering condition may be determined based upon a charge imbalance exceeding a threshold charge differential. In further embodiments, occurrence of the triggering condition may be determined based upon a discharge imbalance exceeding a threshold discharge differential. In still further embodiments, occurrence of the triggering condition may be based upon a weighted score combining charge differentials and discharge differentials exceeding a threshold score. In some embodiments, any of the threshold charge differential, the threshold discharge differential, or the threshold score may be dynamically determined based upon one or more of the following charging site conditions: current availability of input electric power from the power source, predicted future availability of input electric power from the power source, current charging demand for each of the EV charging systems, predicted future demand for each of the EV charging systems, or operational statuses of the EV charging systems. In further embodiments, occurrence of the triggering condition may be based at least in part upon a current or predicted future availability or demand level of the power source. Thus, the triggering condition may include disconnection of the power source from the EV charging systems, which may be indicated by the power source data. Similarly, the triggering condition may include determination that a demand level of the power source exceeds a threshold demand level (e.g., determining the load or demand charges of the electric power grid 20 exceeding thresholds associated with high demand relative to supply of power to the grid). When a triggering condition has occurred, the example charge balancing method 600 continues at block 614. Otherwise, when no triggering condition has occurred, the example charge balancing method 600 ends.

At block 614, the centralized management system 150 and/or one or more system controllers 120 associated with the EV charging systems select one or more charge donor batteries and one or more charge recipient batteries from the EV charging systems and any external batteries 30 or external battery systems 230 at the charging site 10. The donor batteries may be selected as batteries having the highest current charge levels, the lowest current or predicted discharge levels, or the greatest differential between current charge levels and expected discharge levels. Batteries of any external batteries 30 or external battery systems 230 may be preferentially selected as donor batteries in some embodiments. The recipient batteries may be selected as batteries having the lowest current charge levels, the highest current or predicted discharge levels, or the greatest differential between expected discharge levels and current charge levels.

At block 616, the centralized management system 150 and/or one or more system controllers 120 associated with the EV charging systems generate a charge transfer plan between the donor batteries and recipient batteries for a charge transfer via one or more of the DC bus 101, the local AC circuit 201, or the local AC circuit 203. The charge transfer plan may include parameters defining the extent of the charge transfer and timing of the charge transfer. For example, the charge transfer plan may include parameters specifying a maximum charge to transfer, a maximum instantaneous AC or DC current of the charge transfer, and a maximum duration of the charge transfer. In some embodiments, the charge transfer plan may include multiple stages in order to smooth the energy transfer at the donor or recipient EV charging systems. For example, during an initial stage, the energy transferred may be gradually increased over an initial time interval in order to avoid excessive fluctuations of input power received by a recipient EV charging system. Similarly, during a final stage, the energy transferred may be gradually decreased over a final time interval to again avoid excessive fluctuations of input power received by a recipient EV charging system. Specifying the duration of such stages may enable the recipient EV charging station to adjust its power draw from the power source or power provision from its one or more batteries.

At block 618, the centralized management system 150 and/or one or more system controllers 120 associated with the EV charging systems implements the charge transfer plan to cause the EV charging systems to effect the charge transfer. In some embodiments, the centralized management system 150 sends an electronic message to the system controller 120 of each donor EV charging system and each recipient EV charging system to cause the respective system controllers 120 to control the EV charging systems to implement the charge transfer plan to effect the charge transfer. In embodiments in which the charge transfer plan includes batteries of one or more external batteries 30 or external battery systems 230, the centralized management system 150 and/or one or more system controllers 120 may send commands to controllers of the one or more external batteries 30 or external battery systems 230 to control the charging or discharging of such external batteries 30 or external battery systems 230. When the charge transfer plan has been implemented, the example charge balancing method 600 ends.

OTHER CONSIDERATIONS

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. No claim element is to be construed as a means plus function unless the element is expressly recited using the phrase "means for."

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. Unless specifically stated otherwise, the term "some" refers to one or more. Likewise, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

Upon reading this disclosure, those of skill in the art will appreciate still additional alternative structural and functional designs for the systems and a methods disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A vehicle charging system for charging a vehicle, comprising:
a plurality of alternating current (AC) power ports including a first AC power port configured to receive input electric power from an AC power source via a power source circuit and a second AC power port configured to provide output electric power from the vehicle charging system to a local AC circuit at a charging site, wherein the local AC circuit is separate from the power source circuit and wherein the local AC circuit connects the vehicle charging system to an additional AC power port of an additional vehicle charging system at the charging site;
a battery configured to receive and store direct current (DC) electric power derived from the input electric power;
a rectifier disposed between the first AC power port and the battery to convert AC power into DC power to charge the battery;
an inverter disposed between the battery and at least the second AC power port to convert DC power from the battery into AC power to be supplied from the vehicle charging system to the second AC power port;
a vehicle coupling configured to receive a charging current from the battery and to provide an electrical interconnect between the vehicle charging system and the vehicle in order to provide the charging current to the vehicle; and
a system controller comprising one or more processors configured to:
determine occurrence of a triggering condition for charge transfer between the battery of the vehicle charging system and an additional battery of the additional vehicle charging system via the local AC circuit; and
in response to determining occurrence of the triggering condition, control the inverter based on the triggering condition to convert a DC output power from the battery into an AC output power to the second AC power port to provide the AC output power to the local AC circuit.

2. The vehicle charging system of claim 1, wherein the triggering condition comprises disconnection of the AC power source from the first AC power port.

3. The vehicle charging system of claim 1, wherein both the rectifier and the inverter are disposed between the plurality of AC power ports and a DC bus, wherein the DC bus is connected to the battery.

4. The vehicle charging system of claim 1, wherein determining occurrence of the triggering condition comprises detecting receipt of an electronic message from either a site meter or a centralized management system, the electronic message indicating a demand level for the AC power source exceeds a threshold demand level.

5. The vehicle charging system of claim 1, wherein the triggering condition comprises receiving a command from a centralized management system communicatively connected to the vehicle charging system and the additional vehicle charging system via a communication network.

6. The vehicle charging system of claim 1, wherein the system controller determines occurrence of the triggering condition based at least in part upon a charge level of the battery and an additional charge level of the additional battery of the additional charging system, wherein the additional charge level is received in an electronic message received from the additional charging system.

7. The vehicle charging system of claim 1, wherein the triggering condition comprises a charge imbalance between a charge level of the battery of the vehicle charging system and an additional charge level of the additional battery of the additional charging system exceeding a threshold charge differential.

8. The vehicle charging system of claim 1, wherein the AC output power is a first voltage and phase and the input electric power is a second voltage and phase different from the first voltage and phase.

9. The vehicle charging system of claim 1, wherein the system controller is configured to, in response to determining occurrence of a second triggering condition at an additional time, control the rectifier based on the triggering condition to convert an AC input power received from the additional vehicle charging system through the local AC circuit via the second AC power port into a DC input power to charge the battery.

10. A method for managing energy transfers between a plurality of vehicle charging systems each configured to charge vehicles at a charging site, comprising:
charging, via respective alternating current (AC) power ports and rectifiers, respective batteries of a vehicle charging system and an additional vehicle charging system at the charging site using an input electric power from an AC power source via a power source circuit connected to the respective AC power port of each of the vehicle charging system and the additional vehicle charging system, wherein each respective rectifier of the vehicle charging system or the additional vehicle charging system is configured to convert AC power from the respective AC power port into direct current (DC) power to charge the respective battery;
determining, by a system controller of the vehicle charging system, occurrence of a triggering condition for charge transfer between the battery of the vehicle charging system and the additional battery of the additional vehicle charging system via a local AC circuit connecting a secondary AC power port of the vehicle charging system to an additional secondary AC power port of an additional vehicle charging system at the charging site, wherein the local AC circuit is separate from the power source circuit; and
in response to determining occurrence of the triggering condition, controlling, by the system controller, an inverter of the vehicle charging system to effect the charge transfer based upon the triggering condition by converting a DC output power from the battery into an AC output power to the secondary AC power port to provide the AC output power to the local AC circuit.

11. The method of claim 10, further comprising:
in response to determining occurrence of a second triggering condition at an additional time, controlling, by the system controller, the rectifier of the vehicle charging system to effect an additional charge transfer based upon the second triggering condition by converting an AC input power received from the local AC circuit via the secondary AC power port into a DC input power to charge the battery.

12. The method of claim 10, wherein determining occurrence of the triggering condition comprises detecting receipt of an electronic message from either a site meter or a centralized management system, the electronic message indicating a demand level for the AC power source exceeds a threshold demand level.

13. The method of claim 10, wherein the triggering condition comprises receiving a command from a centralized management system communicatively connected to the vehicle charging system and the additional vehicle charging system via a communication network, and further comprising:
sending, to the centralized management system via the communication network, operating data from each of the vehicle charging system and the additional vehicle charging system; and receiving, at the system controller via the communication network, the command from the centralized management system to effect the charge transfer.

14. The method of claim 10, wherein the triggering condition comprises a charge imbalance between a charge level of the battery of the vehicle charging system and an additional charge level of the additional battery of the additional charging system exceeding a threshold charge differential.

15. The method of claim 14, wherein the threshold charge differential is dynamically adjusted based upon one or more of the following charging site conditions: current availability of the input electric power from the AC power source, predicted future availability of the input electric power from the AC power source, current charging demand for each of the vehicle charging system and the additional vehicle charging system, predicted future demand for each of the vehicle charging system and the additional vehicle charging system, or operational statuses of the vehicle charging system and the additional vehicle charging system.

16. The method of claim 10, wherein the triggering condition comprises a discharge imbalance between the charging current provided by the vehicle coupling of the vehicle charging system and an additional charging current of an additional vehicle coupling of the additional vehicle charging system exceeding a threshold discharge differential over a predetermined time interval.

17. A site charging system for charging vehicles at a charging site, comprising:
  a plurality of vehicle charging systems at the charging site connected via a local alternating current (AC) circuit, each vehicle charging system comprising:
    a plurality of AC power ports including a first AC power port configured to receive input electric power from an AC power source via a power source circuit and a second AC power port configured to provide output electric power from the vehicle charging system to a local AC circuit at a charging site, wherein the local AC circuit is separate from the power source circuit;
    a battery configured to receive and store direct current (DC) electric power derived from the input electric power;
    a rectifier disposed between the first AC power port and the battery to convert AC power into DC power to charge the battery;
    an inverter disposed between the battery and at least the second AC power port to convert DC power from the battery into AC power to be supplied from the vehicle charging system to the second AC power port;
    a vehicle coupling configured to receive a charging current from the battery and to provide an electrical interconnect between the vehicle charging system and a vehicle in order to provide the charging current to the vehicle; and
    a system controller comprising one or more processors configured to control charge transfer between the battery of the vehicle charging system and one or more additional batteries of one or more additional vehicle charging systems of the plurality of vehicle charging systems via the local AC circuit; and
  a centralized management system communicatively connected to the plurality of vehicle charging systems via an electronic communication connection, comprising one or more processors configured to:
    determine occurrence of a triggering condition for charge transfer between the respective batteries of a first vehicle charging system and a second vehicle charging system of the plurality of vehicle charging systems via the local AC circuit; and
    in response to determining occurrence of the triggering condition, control (i) the inverter of the first vehicle charging system to convert a DC output power from the battery of the first vehicle charging system into an AC output power to the second AC power port of the first vehicle charging system to provide the AC output power to the local AC circuit and (ii) the rectifier of the second vehicle charging system to convert an AC input power received from the local AC circuit via the second AC power port of the second vehicle charging system into a DC input power to charge the battery of the second vehicle charging system.

18. The vehicle charging system of claim 17, further comprising:
  an external battery system connected to the local AC circuit, comprising an external battery inverter and rectifier and an external battery, wherein the external battery system is configured to receive and store AC power from the local AC circuit and to provide AC power to the local AC circuit,
  wherein the centralized management system is further configured to:
    determine occurrence of a second triggering condition for an additional charge transfer from the external battery system to the respective batteries of one or more vehicle charging systems of the plurality of vehicle charging systems via the local AC circuit; and
    in response to determining occurrence of the second triggering condition, control the external battery system to effect the additional charge transfer based upon the second triggering condition by converting a DC battery output power from the external battery into an AC battery power output to provide the AC battery power output to the local AC circuit.

* * * * *